US008055023B2

(12) United States Patent
Goto et al.

(10) Patent No.: US 8,055,023 B2
(45) Date of Patent: Nov. 8, 2011

(54) VEHICLE CABIN LIGHTING APPARATUS

(75) Inventors: Tomoyuki Goto, Anjo (JP); Rokuro Okada, Kariya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 1108 days.

(21) Appl. No.: 11/173,148

(22) Filed: Jul. 5, 2005

(65) Prior Publication Data

US 2006/0018641 A1    Jan. 26, 2006

(30) Foreign Application Priority Data

Jul. 7, 2004   (JP) ................................ 2004-200907

(51) Int. Cl.
*G03B 15/02* (2006.01)
(52) U.S. Cl. ............ 382/104; 382/100; 396/4; 362/475; 362/476; 362/481; 362/543; 701/36; 701/49; 280/734; 280/735; 353/12; 340/815.66; 340/815.77
(58) Field of Classification Search .................. 382/100, 382/141, 104, 11, 232; 280/735, 739; 362/455, 362/520; 702/155–156, 166; 706/15, 20
See application file for complete search history.

(56) References Cited

U.S. PATENT DOCUMENTS

| | | | | |
|---|---|---|---|---|
| 4,625,329 A * | 11/1986 | Ishikawa et al. | ............... | 382/104 |
| 5,660,454 A * | 8/1997 | Mori et al. | ................... | 362/466 |
| 6,087,953 A * | 7/2000 | DeLine et al. | ............ | 340/815.4 |
| 6,198,998 B1 * | 3/2001 | Farmer et al. | .................... | 701/45 |
| 6,402,354 B1 * | 6/2002 | Tatewaki et al. | .............. | 362/490 |
| 6,501,536 B1 * | 12/2002 | Fredricks | ..................... | 356/3.01 |
| 6,586,884 B2 * | 7/2003 | Leleve | ............................. | 315/82 |
| 6,979,110 B2 * | 12/2005 | Hasegawa et al. | ............. | 362/520 |
| 7,024,292 B2 * | 4/2006 | Remillard et al. | ............... | 701/36 |
| 7,147,246 B2 * | 12/2006 | Breed et al. | ................... | 280/735 |
| 7,164,117 B2 * | 1/2007 | Breed et al. | ................... | 250/221 |
| 7,365,769 B1 * | 4/2008 | Mager | ........................... | 348/113 |
| 7,415,126 B2 * | 8/2008 | Breed et al. | ................... | 382/100 |

(Continued)

FOREIGN PATENT DOCUMENTS

DE          298 22 554 U1     4/1999

(Continued)

OTHER PUBLICATIONS

Office Action from German Patent Office issued on Mar. 14, 2006 for the corresponding German patent application No. 10 2005 031 637.9-42 (and English translation thereof).

(Continued)

*Primary Examiner* — John Lee
(74) *Attorney, Agent, or Firm* — Posz Law Group, PLC

(57) ABSTRACT

A plurality of lighting units are positioned forwardly of the driver seat in the cabin of a vehicle for applying infrared radiations in respective directions to the vehicle driver seated on the driver seat. The intensities of the emitted infrared radiations are controlled according to respective basic controlled variables depending on the illuminance in the vehicle cabin. The position and orientation of the face of the vehicle driver are recognized from an image captured of the vehicle driver by an imaging device, and the basic controlled variables are corrected according to the recognized position and orientation, thereby adjusting the intensities of the infrared radiations emitted from the lighting units and a balance of the infrared radiations emitted from the lighting units. Thereafter, the illuminance in the vehicle cabin and the recognized position and orientation change, then corrective coefficients for the basic controlled variables are updated depending on the changes.

8 Claims, 14 Drawing Sheets

U.S. PATENT DOCUMENTS

| | | | |
|---|---|---|---|
| 2001/0013825 A1* | 8/2001 | DeLine et al. | 340/425.5 |
| 2001/0019620 A1* | 9/2001 | Nagai et al. | 382/104 |
| 2002/0024713 A1* | 2/2002 | Roberts et al. | 359/267 |
| 2002/0181774 A1 | 12/2002 | Ishikura | |
| 2002/0196131 A1* | 12/2002 | McCarthy et al. | 340/425.5 |
| 2003/0076688 A1* | 4/2003 | Kobayashi | 362/510 |
| 2003/0107323 A1* | 6/2003 | Stam | 315/82 |
| 2003/0209893 A1* | 11/2003 | Breed et al. | 280/735 |
| 2004/0022416 A1* | 2/2004 | Lemelson et al. | 382/104 |
| 2004/0070551 A1* | 4/2004 | Walck et al. | 345/7 |
| 2004/0109154 A1* | 6/2004 | Wallace et al. | 356/4.03 |
| 2004/0129478 A1* | 7/2004 | Breed et al. | 180/273 |
| 2005/0074221 A1* | 4/2005 | Remillard et al. | 385/147 |

FOREIGN PATENT DOCUMENTS

| | | |
|---|---|---|
| DE | 100 61 039 A1 | 6/2002 |
| DE | 103 43 062 A1 | 5/2004 |
| DE | 102 51 133 B3 | 7/2004 |
| DE | 203 18 527 U1 | 8/2004 |
| JP | A-01-128687 | 5/1989 |
| JP | A-2001-057676 | 2/2001 |
| JP | A-2001-206103 | 7/2001 |
| JP | A-2001-358987 | 12/2001 |
| JP | 2002-352229 | 12/2002 |
| JP | A-2003-075717 | 3/2003 |

OTHER PUBLICATIONS

Office Action dated Oct. 14, 2008 in corresponding Japanese patent application No. 2004-200907 (and English translation).

Office Action dated Oct. 15, 2007 in corresponding German Patent Application No. 10 2005 031 637.9-42 (and English translation).

* cited by examiner

VEHICLE CABIN LIGHTING APPARATUS

CROSS-REFERENCE TO RELATED APPLICATIONS

This application is based upon and claims the benefits of priority from the prior Japanese Patent Application No. 2004-200907, filed on Jul. 7, 2004, the entire contents of which are incorporated herein by reference.

BACKGROUND OF THE INVENTION

1. Field of the Invention

The present invention relates to a vehicle cabin lighting apparatus for lighting the interior of a vehicle cabin of a vehicle to allow an imaging device installed in the vehicle cabin to capture an image of a subject, such as a vehicle driver, in the vehicle cabin.

2. Description of the Related Art

Heretofore, there has been known a vehicular imaging device for capturing an image of a vehicle occupant such as a vehicle driver in the cabin of a vehicle or a person approaching the vehicle, with an imaging device that is installed in the vehicle cabin, and processing the captured image to automatically detect an action of the vehicle occupant or features of the approaching person.

If the area surrounding a subject to be imaged by the imaging device is too dark, then the imaging device fails to capture a clear image of the subject. To solve this problem, the imaging device is combined with a lighting unit for illuminating the subject. When the lighting unit is energized, it emits illuminating light to illuminate the subject, which is made bright enough to be reliably imaged by the imaging device. For details, reference should be made to Japanese laid-open patent publication No. 2002-352229, for example.

The above publication shows a plurality of lighting units that are energizable in synchronism with imaging operation of the imaging device. A subject to be imaged is illuminated by the lighting units, and an image of the subject which is captured by the imaging device is processed for the user to accurately recognize a desired area of the subject. However, the intensities of illuminating lights emitted from the respective lighting units are constant at all times. If the subject changes its orientation with respect to the imaging device, e.g., if the face of a vehicle occupant to be imaged changes its orientation with respect to the imaging device, then shadows are created on the subject by the illuminating light, and the imaging device fails to capture a clear image of the subject because of the shadows.

If the subject changes its position, particularly, its distance to the lighting units, e.g., if the position of a vehicle occupant to be imaged which is seated on a seat in the vehicle cabin is changed, then the subject may not be illuminated with an adequate amount of illuminating light. For example, the illuminating light from the lighting units may be too intensive on the subject, tending to develop halation in the captured image of the subject. Alternatively, the illuminating light from the lighting units may be too weak, making the captured image of the subject dark and failing to detect a behavior of the subject from the processed image of the subject.

SUMMARY OF THE INVENTION

It is therefore an object of the present invention to provide a vehicle cabin lighting apparatus for adequately lighting a subject, such as a vehicle driver, in a vehicle cabin at all times regardless of the position and orientation of the subject in the vehicle cabin when the subject is imaged by an imaging device that is installed in the vehicle cabin.

According to the present invention, there is provided a vehicle cabin lighting apparatus for lighting a vehicle cabin of a vehicle to allow an imaging device installed in the vehicle cabin to capture an image of a subject in the vehicle cabin, comprising at least one lighting unit disposed in the vehicle cabin, for lighting an imaging area in the vehicle cabin which is to be imaged by the imaging device, the imaging area including the subject, a brightness detecting unit for detecting the brightness in the vehicle cabin or the brightness of the subject, and a light emission controller for controlling the intensity of light emitted from the lighting unit, depending on the brightness in the vehicle cabin or the brightness of the subject which is detected by the brightness detecting unit.

Since the intensity of light emitted from the lighting unit is controlled depending on the brightness in the vehicle cabin or the brightness of the subject, the subject or the imaging area which is to be imaged by the imaging device is lighted in order to allow the imaging device to capture an optimum image of the subject in the vehicle cabin.

Even if the brightness in the vehicle cabin or the brightness of the subject changes as the vehicle travels on or due to weather changes or the like, the imaging device can capture an optimum image of the subject at all times regardless of such a change in the brightness in the vehicle cabin or the brightness of the subject. The captured optimum image of the subject may be supplied to a behavior detecting device which processes the captured image to monitor a behavior of the vehicle driver or a theft prevention device which processes the captured image to check unauthorized entry into the vehicle.

The brightness detecting unit may be any device capable of detecting the brightness in the vehicle cabin or the brightness of the subject. For example, the brightness detecting unit may comprise an illuminance sensor, i.e., a first illuminance sensor, for detecting the illuminance in the vehicle cabin, or may be a brightness acquiring unit for acquiring the brightness in the vehicle cabin or the brightness of the subject by processing an image captured by the imaging device.

The image captured by the imaging device is affected by not only the brightness in the vehicle cabin or the brightness of the subject, but also the position of the subject, particularly the distance between the lighting unit and the subject. Preferably, therefore, the vehicle cabin lighting apparatus should further comprise a position detecting unit for detecting the position of the subject in the vehicle cabin, and the light emission controller should control the intensity of light emitted from the lighting unit, depending on the brightness in the vehicle cabin or the brightness of the subject which is detected by the brightness detecting unit, and the position of the subject which is detected by the position detecting unit.

Therefore, the intensity of light emitted from the lighting unit is controlled depending on not only the brightness in the vehicle cabin or the brightness of the subject, but also the position of the subject. For example, if the subject is positioned remotely from the lighting unit and the captured image thereof is too dark, then the intensity of light emitted from the lighting unit is increased. Conversely, if the subject is positioned closely to the lighting unit and the captured image thereof is too bright, tending to develop halation, then the intensity of light emitted from the lighting unit is lowered.

The vehicle cabin lighting apparatus is thus capable of optimally lighting the subject to make it possible for the imaging device to have a wider range in which to capture an image of the vehicle driver.

The position detecting unit may be a distance sensor for detecting the distance from the lighting unit to the vehicle driver or may estimate the position of the vehicle driver from the position of a seat on which the vehicle driver is seated. Alternatively, the position detecting unit may detect the position of the subject in the vehicle cabin by processing an image captured by the imaging device. The latter arrangement is advantageous in that the position of the subject can be detected without the need for a distance sensor, a position sensor, or the like, and makes the vehicle cabin lighting apparatus simpler in structure.

The position of the subject can be detected from the captured image as follows: The data of the captured image are processed to extract a plurality of features of the vehicle driver, e.g., the contour of the face of the vehicle driver, and the positions of the eyes, nose, mouse, etc. on the face, and the distances between the extracted features are determined on the captured image. The position of the subject, i.e., the distance between the imaging device and hence the lighting unit and the subject, is detected from the determined distances.

If the subject comprises a vehicle occupant seated on a seat in the vehicle cabin, then the imaging device and the lighting unit may be disposed around the seat for imaging and lighting the vehicle occupant seated on the seat in the vehicle cabin.

If the lighting unit comprises a plurality of lighting units disposed around the seat in the vehicle cabin, then the vehicle cabin lighting apparatus may further comprise a seated orientation detecting unit for detecting the orientation of the vehicle occupant seated on the seat in the vehicle cabin by processing an image captured by the imaging device, and the light emission controller may control a balance of lights emitted from the lighting units, depending on the intensities of the lights emitted from the lighting units and the orientation of the vehicle occupant which is detected by the seated orientation detecting unit.

If the vehicle occupant faces obliquely rightwardly of the direction in which the vehicle travels, for example, the intensity of the light emitted from the lighting unit which is disposed rightwardly of the vehicle occupant is increased. Conversely, if the vehicle occupant faces obliquely leftwardly of the direction in which the vehicle travels, for example, the intensity of the light emitted from the lighting unit which is disposed leftwardly of the vehicle occupant is increased. In this manner, the captured image is prevented from having unwanted shadows when the vehicle occupant faces in different directions.

If the subject comprises a vehicle driver and the vehicle cabin lighting apparatus is incorporated in a system for detecting a behavior, e.g., a doze ox the like, of the vehicle driver, then the lighting units may be mounted on an instrument panel and an inner roof surface above the front windshield of the vehicle. If the subject comprises a vehicle occupant seated on a front passenger seat in the vehicle cabin and the vehicle cabin lighting apparatus is incorporated in a system for detecting the position of the vehicle occupant seated on the front passenger seat based on the captured image of the vehicle occupant for the purpose of controlling an air bag for the front passenger seat, then the lighting units may be mounted on a front pillar forward of the front passenger seat, and combined with a map lamp forward of the front passenger seat and a room lamp on an inner room surface.

The lighting unit may be capable of controlling the direction of light emitted therefrom. With this arrangement, the vehicle cabin lighting apparatus may further comprise a seated orientation detecting unit for detecting the orientation of the vehicle occupant seated on the seat in the vehicle cabin by processing an image captured by the imaging device. The light emission controller may control the direction of light emitted from the lighting unit, depending on the intensity of the light emitted from the lighting unit and the orientation of the vehicle occupant which is detected by the seated orientation detecting unit.

When the vehicle runs into or out of a tunnel, for example, the brightness in the vehicle cabin or the brightness of the subject abruptly changes at the entrance or exit of the tunnel. When the brightness in the vehicle cabin or the brightness of the subject abruptly changes, a delay tends to occur in controlling the intensity of the light emitted from the lighting unit, resulting in a temporary shortage of light applied to the subject and halation in the captured image.

For optimally controlling the intensity of the light emitted from the lighting unit, the vehicle cabin lighting apparatus may further comprise a predicting unit for predicting a change in the brightness in the vehicle cabin or the brightness of the subject as the vehicle travels on. When the predicting unit predicts a change in the brightness in the vehicle cabin or the brightness of the subject, sand light emission controller may correct the intensity of the light emitted from the lighting unit based on the predicted change.

The brightness in the vehicle cabin or the brightness of the subject changes as the vehicle travels on because the brightness around the vehicle changes. The brightness around the vehicle changes depending on the time at which the vehicle travels, the weather in which the vehicle travels, and the location in which the vehicle travels. In order to predict a change in the brightness in the vehicle cabin or the brightness of the subject, various items of information, i.e., the present time at which the vehicle travels, the present weather in which the vehicle travels, the location in which the vehicle travels, the direction in which the vehicle travels, etc. may be obtained via a vehicle navigation system, a radio communication system, or the like. Then, a change in the brightness in the vehicle cabin or the brightness of the subject may be predicted based on the obtained items of information.

However, to obtain various items of information for predicting a change in the brightness in the vehicle cabin or the brightness of the subject, not only a vehicle navigation system, a radio communication system, or the like is required, but also complex predictive calculations need to be performed for predicting a change in the brightness in the vehicle cabin or the brightness of the subject. Therefore, the cost of the vehicle cabin lighting apparatus would be unduly increased.

According to the present invention, the predicting unit comprises a second illuminance sensor for detecting the illuminance around the vehicle in a front position with respect to the direction in which the vehicle travels on, the predicting unit predicts a change in the brightness in the vehicle cabin or the brightness of the subject based on a change in the illuminance detected by the second illuminance sensor.

The brightness in the vehicle cabin or the brightness of the subject changes depending on the illuminance around the vehicle at a front position with respect to the direction in which the vehicle travels, and the brightness in the vehicle cabin or the brightness of the subject changes with a time delay. Therefore, when the illuminance around the vehicle at the front position with respect to the direction in which the vehicle travels is detected by the second illuminance sensor, a change in the brightness in the vehicle cabin or the brightness of the subject can easily and reliably be predicted from the change in the illuminance around the vehicle at the front position. The vehicle cabin lighting apparatus which incorporates the second illuminance sensor is relatively low in cost.

As described above, the vehicle cabin lighting apparatus is typically used to light a vehicle occupant seated on a seat in the vehicle cabin when the vehicle occupant seated on the seat is imaged by the imaging unit. However, the vehicle cabin lighting apparatus may also be used to light an unauthorized intruder when the unauthorized intruder is imaged by the imaging unit in combination with a theft prevention device which serves to prevent the vehicle from being stolen by a person attempting to make unauthorized entry into the vehicle cabin when the vehicle is parked.

Specifically, if the vehicle cabin lighting apparatus is used in combination with such a theft prevention device, then the imaging device and the lighting unit are positioned across the vehicle cabin from a door of the vehicle for imaging and lighting an unauthorized intruder as the subject attempting to enter the vehicle cabin through the door. When an unauthorized intruder breaks the door and illegally enters the vehicle cabin, the lighting unit applied light to the unauthorized intruder from its front side. Consequently, the imaging unit can reliably capture a clear image of the face and appearance of the unauthorized intruder.

Inasmuch as the vehicle cabin lighting apparatus is used when a vehicle occupant and an unauthorized intruder are to be imaged in the vehicle cabin, it is desirable for the lighting unit to emit a radiation other than visible light. For example, the lighting unit may emit an infrared radiation. If the lighting unit emits an infrared radiation, then the imaging device needs to capture an image of the subject in the imaging area based on infrared rays which are reflected from the subject when the subject is irradiated with the infrared radiation emitted from the lighting unit.

According to the present invention, there is also provided a vehicle occupant lighting control system for controlling the lighting of a vehicle occupant in a vehicle cabin in order to capture an image of the vehicle occupant with an imaging device, comprising a lighting unit disposed in the vehicle cabin, for emitting light to illuminate the vehicle occupant to be imaged by the imaging device, an illuminance sensor disposed in the vehicle occupant, for detecting the illuminance in the vehicle cabin, and a controller for controlling the intensity of the light emitted from the lighting unit based on the illuminance detected by the illuminance sensor.

The controller may acquire the brightness of an image captured of the vehicle occupant by the imaging device by processing the captured image, and control the intensity of the light emitted from the lighting unit based on the acquired brightness.

The controller may acquire the position of the vehicle occupant by processing an image captured of the vehicle occupant by the imaging device, and control the intensity of the light emitted from the lighting unit based on the acquired position.

The vehicle occupant lighting control system may comprise a plurality of lighting units disposed at spaced locations in the vehicle cabin, wherein the controller acquires the position and orientation of the vehicle occupant by processing an image captured of the vehicle occupant by the imaging device, and independently controls the intensities of light emitted from the lighting units based on the acquired position and orientation.

The lighting unit may comprise a lighting unit capable of adjusting the direction of light emitted therefrom, and the controller acquires the orientation of the vehicle occupant by processing an image captured of the vehicle occupant by the imaging device, and control the lighting unit to adjust the direction of the light emitted therefrom based on the acquired orientation.

The lighting unit may be capable of vertically, horizontally, or vertically and horizontally adjusting the direction of the light emitted therefrom.

According to the present invention, there is further provided a vehicle occupant lighting control system for controlling the lighting of a vehicle occupant in a vehicle cabin in order to capture an image of the vehicle occupant with an imaging device upon unauthorized entry made into the vehicle cabin by the vehicle occupant, comprising a pair of lighting units disposed across the vehicle cabin from a pair of opposite doors, respectively, for emitting light to illuminate the respective doors to be imaged by the imaging device, an illuminance sensor disposed in the vehicle occupant, for detecting the illuminance in the vehicle cabin, and a controller for energizing one of the lighting units which is positioned across the vehicle cabin from one of the opposite doors through which the vehicle occupant has made unauthorized entry into the vehicle cabin, and controlling the intensity of the light emitted from the energized lighting unit based on the illuminance detected by the illuminance sensor. The controller may acquire the brightness of an image captured of the vehicle occupant by the imaging device by processing the captured image, and control the intensity of the light emitted from the energized lighting unit based on the acquired brightness. The controller may acquire the position of the vehicle occupant by processing an image captured of the vehicle occupant by the imaging device, and control the intensity of the light emitted from the energized lighting unit based on the acquired position.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
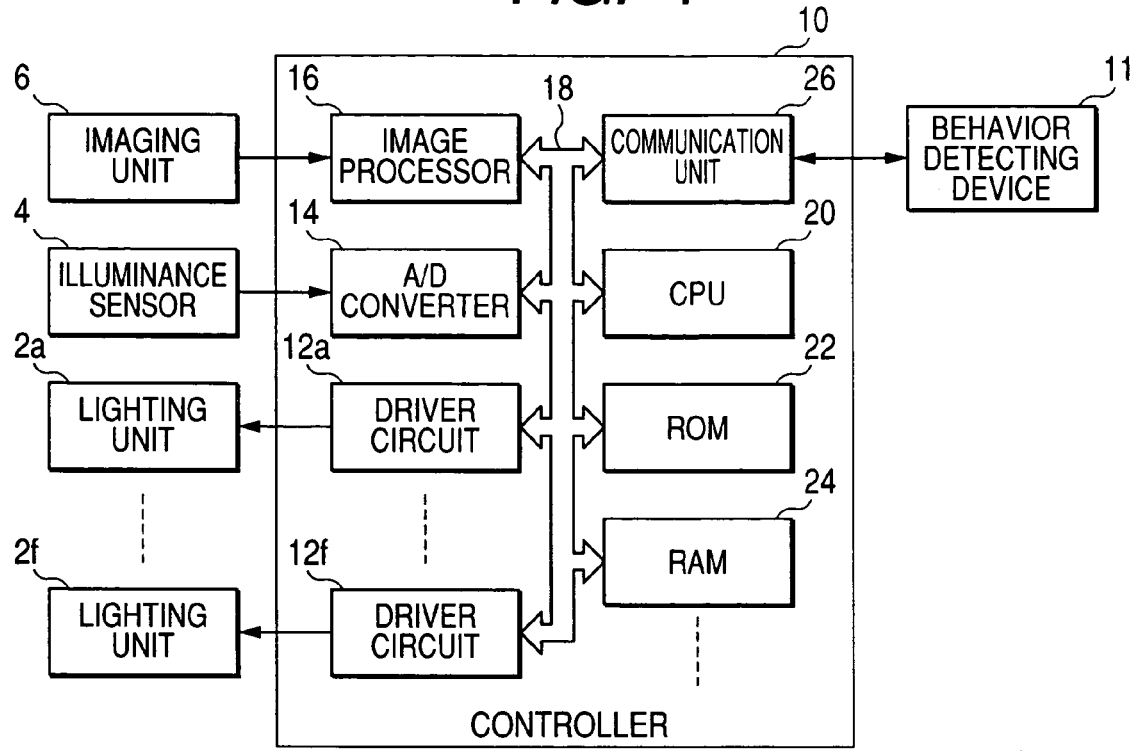
FIG. 1 is a block diagram of a vehicle cabin lighting apparatus according to a first embodiment of the present invention.

FIG. 1 shows in block form a vehicle cabin lighting apparatus according to a first embodiment of the resent invention.

As shown in FIG. 1, the vehicle cabin lighting apparatus according to the first embodiment has a plurality of, specifically six, lighting units $2a$ through $2f$ (see also FIGS. 2 and 3) disposed in the cabin of a vehicle, such as an automobile, in front of and around the driver seat, and an imaging device 6 disposed in front of the driver seat. The vehicle cabin lighting apparatus controls the intensities of light, specifically infrared radiations, emitted from the lighting units $2a$ through $2f$ to allow the imaging device 6 to capture an optimum image of a vehicle driver seated on the driver seat. The vehicle cabin lighting apparatus also has a controller 10 including a CPU 20, a ROM 22, a RAM 24, and a bus 18 interconnecting the CPU 20, the ROM 22, and the RAM 24. The controller 10 is implemented by a microcomputer. The lighting units $2a$ through $2f$ and the imaging device 6 are electrically connected to the controller 10.

The controller 10 also includes a plurality of, specifically six, driver circuits $12a$ through $12f$ for regulating electric currents supplied to the respective lighting units $2a$ through $2f$ to control the intensities of infrared radiations emitted from the lighting units $2a$ through $2f$. The driver circuits $12a$ through $12f$ are connected to the bus 18. The controller 10 further includes an image processor 16 for processing the data of an image captured by the imaging device 6 to extract features of the face of the vehicle driver, e.g., the contour of the face, and the positions of the eyes, nose, mouse, etc. on the face, and a communication unit 26 for transmitting image data processed by the image processor 16 to a behavior detecting device 11 and receiving signals from the behavior detecting device 11. The behavior detecting device 11 detects a behavior of the driver, such as a doze, based on the supplied image data.

An illuminance sensor 4 (see also FIG. 3) is mounted on a lower roof surface of the vehicle above the driver seat for detecting the illuminance in the vehicle cabin. The illuminance sensor 4 is electrically connected to the controller 10. When the illuminance sensor 4 detects the illuminance in the vehicle cabin, it supplies a signal representing the detected illuminance to an A/D converter 14 in the controller 10 which is connected to the bus 18. The A/D converter 14 converts the illuminance data into digital data.

Figure 2:
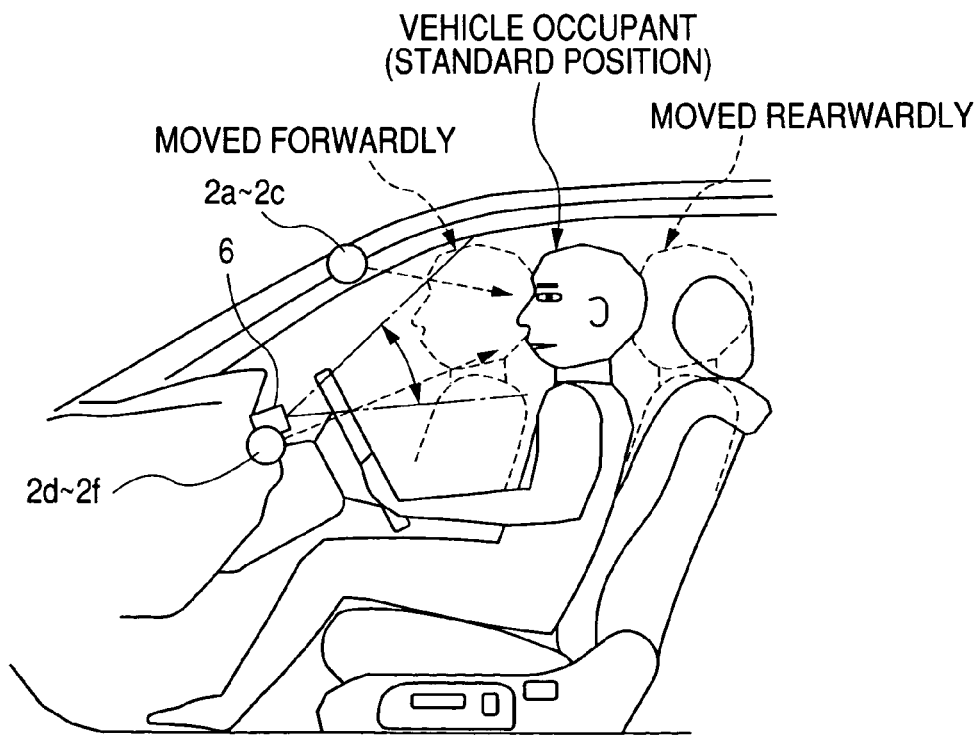
FIG. 2 is a schematic side elevational view showing the positions of lighting units in a vehicle cabin and how a vehicle driver, i.e., a subject to be imaged, changes its position in the vehicle cabin which incorporates the vehicle cabin lighting apparatus according to the first embodiment.
Figure 3:
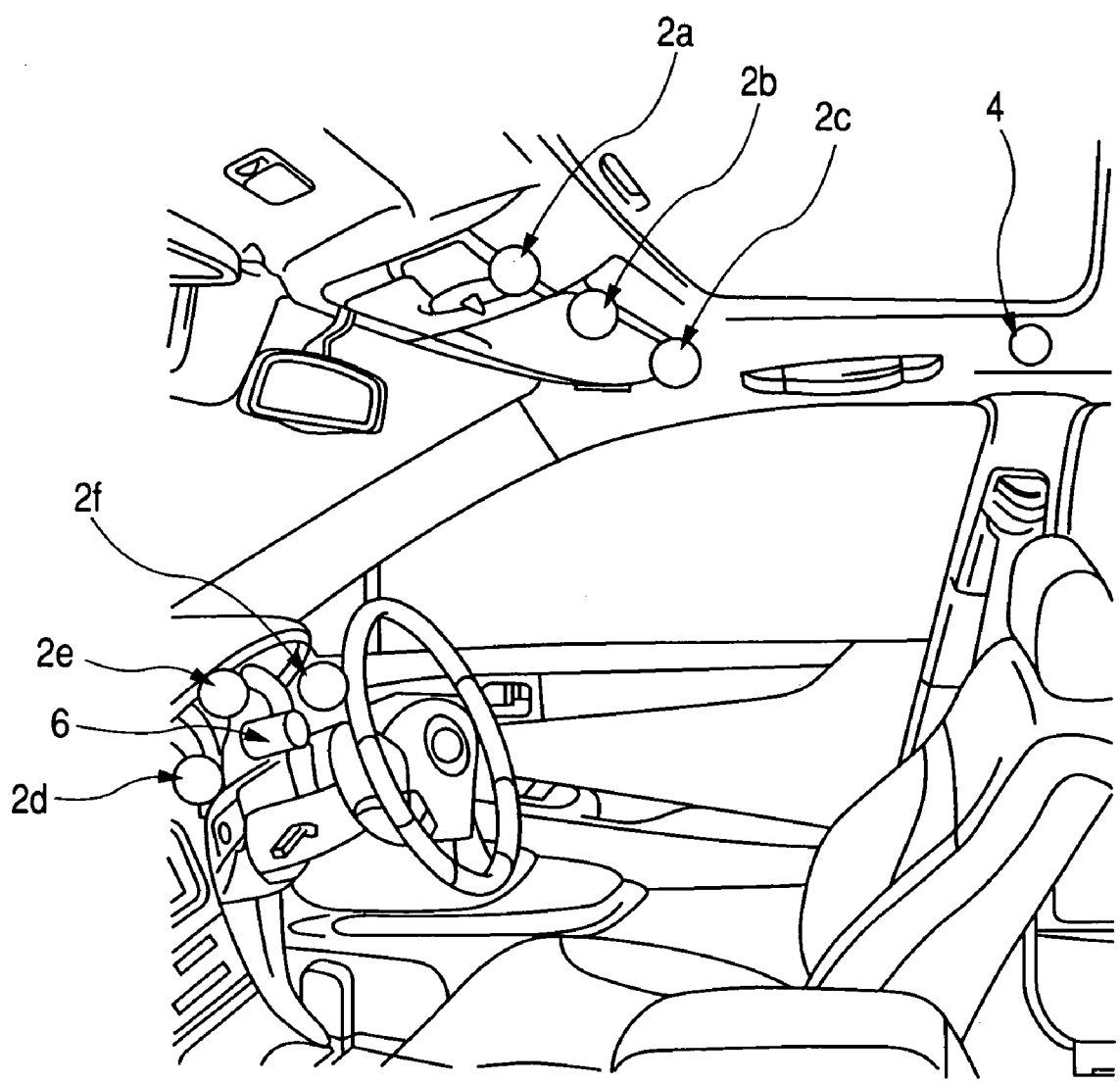
FIG. 3 is a fragmentary perspective view showing the layout of lighting units, an imaging device, and an illuminance sensor in the vehicle cabin which incorporates the vehicle cabin lighting apparatus according to the first embodiment.

As shown in FIGS. 2 and 3, of the lighting units $2a$ through $2f$, the lighting units $2a$, $2b$, $2c$ are disposed on a lower roof surface just above a front windshield for applying their emitted light from front positions obliquely upward of the vehicle driver toward left, front, and right sides, respectively, of the vehicle driver, and the lighting units $2d$, $2e$, $2f$ are disposed on an instrument panel behind the steering wheel for applying their emitted light from front positions obliquely downward of the vehicle driver toward the left, front, and right sides, respectively, of the vehicle driver.

Specifically, as shown in FIG. 3, the lighting unit $2a$ is disposed in or near a map lamp on the lower roof surface. The lighting unit $2b$ is disposed on the lower roof surface near the center of a visor over the driver seat out of physical interference with the visor The lighting unit $2c$ is disposed on the inner roof surface near the front pillar near the driver seat or on front pillar near the driver seat near the inner roof surface. The lighting unit $2d$ is disposed near the left end of the instrument panel. The lighting unit $2e$ is disposed on a central area of the instrument panel. The imaging device 6 is also disposed near the lighting unit $2e$ on the central area of the instrument panel. The lighting unit $2f$ is disposed near the right end of the instrument panel.

The imaging device 6 captures an image of a subject, i.e., the vehicle driver, based on infrared rays which are reflected from the vehicle driver when the vehicle driver is irradiated with infrared radiation emitted from the lighting units $2a$ through $2f$. Therefore, the imaging device 6 has a filter for selectively passing infrared rays therethrough and a two-dimensional image-capturing device such as a CCD or CMOS device for capturing a subject image based in infrared rays that have passed through the filter.

The controller 10 operates to control the intensities of infrared radiations emitted from the lighting units $2a$ through $2f$, as follows: The CPU 20 executes a control program stored in the ROM 22 to control the intensities of infrared radiations emitted from the lighting units $2a$ through $2f$ for allowing the imaging device 6 to capture an optimum image of the face of the vehicle driver at all times even when the vehicle driver changes its position forward or rearward from a standard position as indicated by the broken lines in FIG. 2, or even when the brightness in the vehicle cabin changes as the vehicle travels on.

A control process that is performed by the CPU 20 for controlling the intensities of infrared radiations emitted from the lighting units $2a$ through $2f$ will be described below with reference to FIG. 4.

Figure 4:
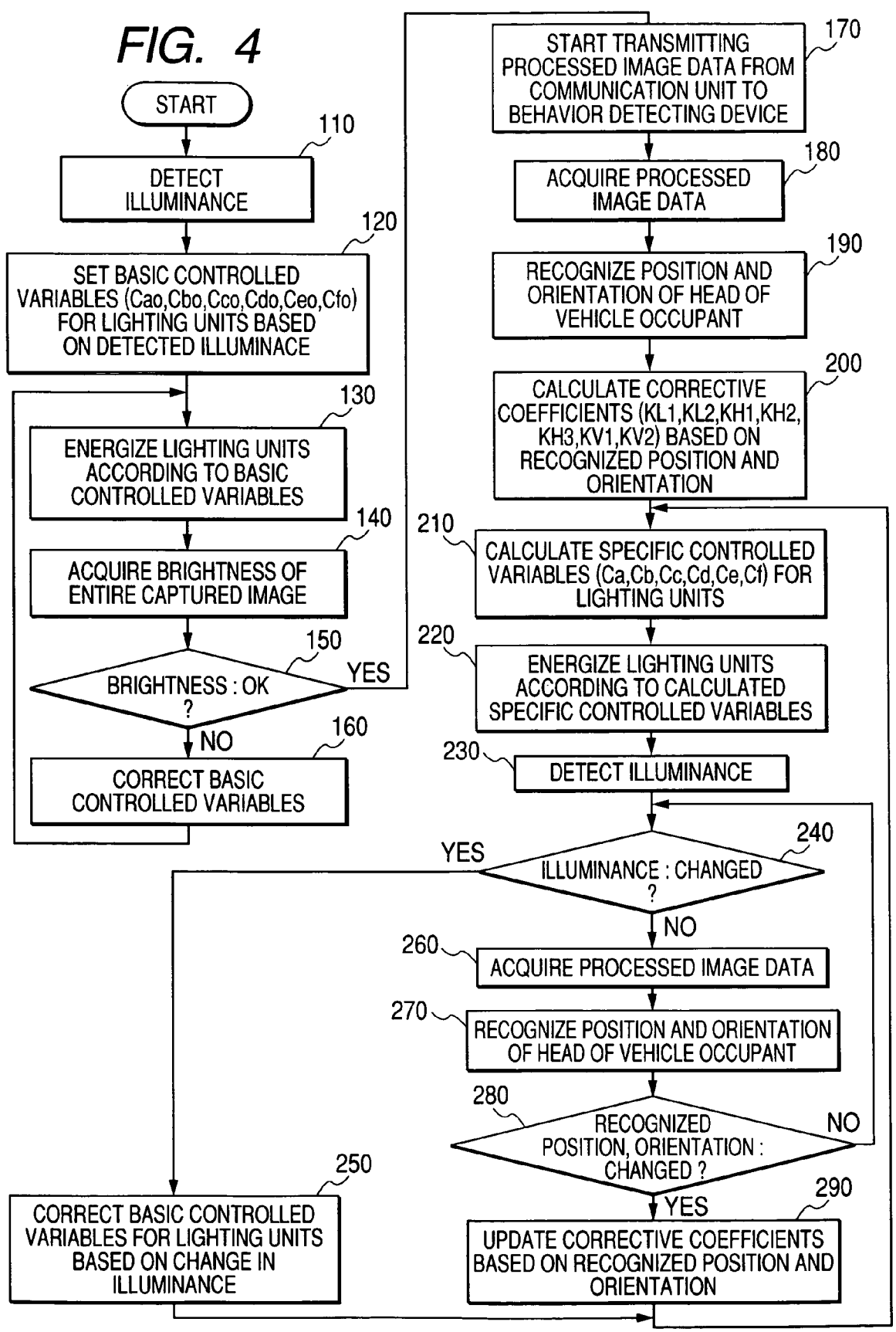
FIG. 4 is a flowchart of a control process carried out by a controller of the vehicle cabin lighting apparatus according to the first embodiment.

FIG. 4 shows the control process which is carried out by the CPU 20 when the communication unit 26 receives a lighting control command sent from the behavior detecting device 11. When the control process starts to be performed, the illuminance sensor 4 detects the illuminance around the driver seat in the vehicle cabin in step 110. Then, the CPU 20 sets basic controlled variables Cao, Cbo, Cco, Cdo, Ceo, Cfo for controlling electric currents to be supplied to the lighting units $2a$ through $2f$ and hence the intensities of infrared radiations emitted from the lighting units $2a$ through $2f$, based on the detected illuminance in step 120.

In step 130, the CPU 20 energize the driver circuits $12a$ through $12f$ for the respective lighting units $2a$ through $2f$ based on the respective basic controlled variables Cao through Cfo to supply electric currents corresponding to the respective basic controlled variables Cao through Cfo to the lighting units 2a through 2f. As a result, the intensities of infrared radiations emitted from the lighting units 2a through 2f are controlled so as to be commensurate with the respective basic controlled variables Cao through Cfo.

In step 140, the CPU 20 acquires the brightness of an entire image of the vehicle driver that is captured by the imaging device 6, from the image processor 16. In step 150, the CPU 20 determines whether the acquired brightness of the captured image falls in a preset allowable range or not, and hence determines whether the image processor 16 is capable of extracting feature points on the face of the vehicle driver or not.

If the CPU 20 judges in step 150 that the acquired brightness of the captured image does not fall in the preset allowable range, then control goes to step 160 in which the CPU 20 corrects the basic controlled variables Cao through Cfo to bring the acquired brightness of the captured image into the preset allowable range. Then, control goes back to step 130.

The CPU 20 corrects the basic controlled variables Cao through Cfo in step 160 as follows: If the acquired brightness of the captured image is lower than the preset allowable range, i.e., if the captured image is too dark, then the CPU 20 increases all the basic controlled variables Cao through Cfo by a predetermined offset in order to increase the intensities of infrared radiations emitted from the lighting units 2a through 2f. If the acquired brightness of the captured image is higher than the preset allowable range, i.e., if the captured image is too bright, then the CPU 20 reduces all the basic controlled variables Cao through Cfo by a predetermined offset in order to reduce the intensities of infrared radiations emitted from the lighting units 2a through 2f.

If the CPU 20 judges in step 150 that the acquired brightness of the captured image falls in the preset allowable range and hence that the image processor 16 is capable of extracting feature points on the face of the vehicle driver, then control goes to step 170. In step 170, the CPU 20 issues a transfer command to the communication unit 26 to transfer the processed image data representing feature points on the face of the vehicle driver from the image processor 16 to the behavior detecting device 11.

Then, in step 180, the CPU 20 acquires the processed image data from the image processor 16. In step 190, the CPU 20 recognizes the position and orientation of the face of the vehicle driver based on the acquired processed image data. The CPU 20 calculates corrective coefficients KL1, KL2, KH1, KH2, KH3, KV1, KV2 with respect to the basic controlled variables Cao through Cfo based on the recognized position and orientation in step 200.

Specifically, the position of the face of the vehicle driver to be imaged varies with the body type of the vehicle driver, and the orientation of the face of the vehicle driver also changes as the vehicle driver moves. In step 190, the CPU 20 recognizes the position and orientation of the face of the vehicle driver from the distances between the feature points on the face of the vehicle driver and the shapes of graphic patterns formed by lines interconnecting the feature points. In step 200, the CPU 20 calculates corrective coefficients KL1, KL2, KH1, KH2, KH3, KV1, KV2 for correcting the basic controlled variables Cao through Cfo to allow the imaging device 6 to capture a clear image of the face of the vehicle driver, based on the recognized position and orientation.

Figure 5A:
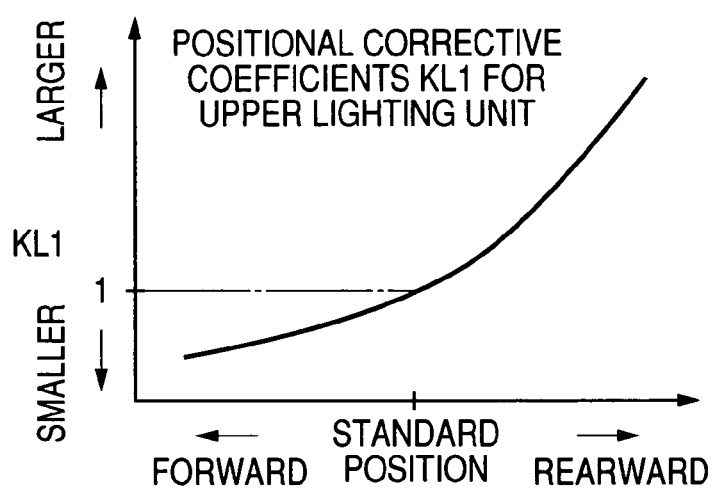
FIGS. 5A through 5G are diagrams showing maps that are used to calculate corrective coefficients used in the control process shown in FIG. 4.
Figure 5B:
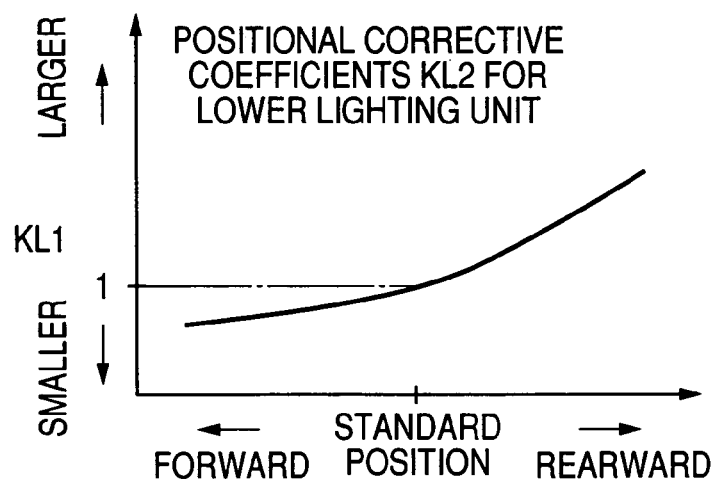

Of the above corrective coefficients, the corrective coefficients KL1, KL2 are positional corrective coefficients that are set based on the position of the face of the vehicle driver, or specifically a forward or rearward shift of the face of the vehicle driver from the standard position shown in FIG. 2, using maps shown in FIGS. 5A and 5B. The positional corrective coefficient KL1 serves to correct the basic controlled variables Cao through Cco for the upper lighting units 2a through 2c that are mounted on the inner roof surface in the vehicle cabin, and the positional corrective coefficient KL2 serves to correct the basic controlled variables Cdo through Cfo for the lower lighting units 2d through 2f that are mounted on the instrument panel in the vehicle cabin.

As shown in FIGS. 5A and 5B, the maps for determining the positional corrective coefficients KL1, KL2 are established as follows: When the face of the vehicle driver is positioned forwardly of the standard position, so that the distance from the lighting units 2a through 2f to the face of the vehicle driver is relatively small, the positional corrective coefficients KL1, KL2 are set to values smaller than "1" in order to reduce the intensities of infrared radiations emitted from the lighting units 2a through 2f. When the face of the vehicle driver is positioned rearwardly of the standard position, so that the distance from the lighting units 2a through 2f to the face of the vehicle driver is relatively large, the positional corrective coefficients KL1, KL2 are set to values greater than "1" in order to increase the intensities of infrared radiations emitted from the lighting units 2a through 2f.

Figure 5C:
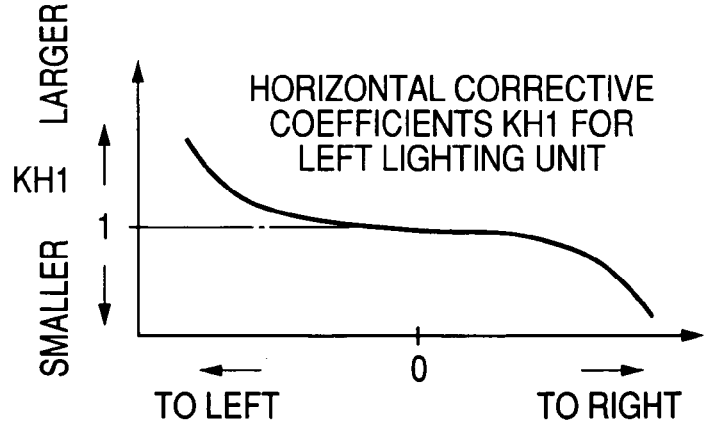
Figure 5D:
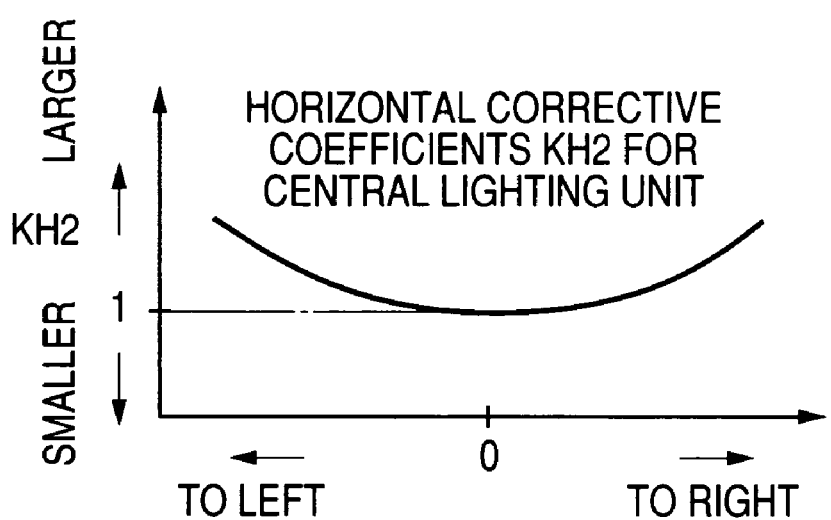
Figure 5E:
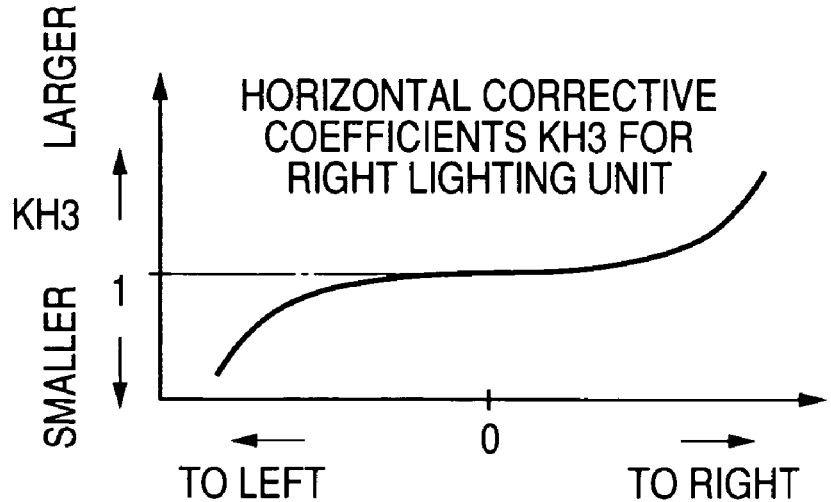

The corrective coefficients KH1, KH2, KH3 are horizontal corrective coefficients that are set based on the horizontal orientation of the face of the vehicle driver, or specifically a horizontal shift of the face of the vehicle driver from a standard orientation (0) of the face wherein the vehicle driver sees straight forwardly, using maps shown in FIGS. 5C, 5D, and 5E. The horizontal corrective coefficient KH1 serves to correct the basic controlled variables Cao, Cdo for the lighting units 2a, 2d that are disposed leftwardly of the driver seat in the vehicle cabin. The horizontal corrective coefficient KH2 serves to correct the basic controlled variables Cbo, Ceo for the lighting units 2b, 2e that are disposed centrally right in front of the driver seat in the vehicle cabin. The horizontal corrective coefficient KH3 serves to correct the basic controlled variables Cco, Cfo for the lighting units 2c, 2f that are disposed rightwardly of the driver seat in the vehicle cabin.

As shown in FIGS. 5C, 5D, and 5E, the maps for determining the horizontal corrective coefficients KH1, KH2, KH3 are established as follows: When the face of the vehicle driver is oriented in a direction leftward of the reference direction, the horizontal corrective coefficients KH1, KH2, KH3 are set to such values as to increase the intensities of infrared radiations emitted from the left lighting units 2a, 2d and the central lighting units 2b, 2e and reduce the intensities of infrared radiations emitted from the right lighting units 2c, 2f. Specifically, the horizontal corrective coefficients KH1, KH2 are set to values greater than "1" and the horizontal corrective coefficient KH3 is set to a value smaller than "1" in order to make the intensities of infrared radiations emitted from the left lighting units 2a, 2d and the central lighting units 2b, 2e greater and to make the intensities of infrared radiations emitted from the right lighting units 2c, 2f smaller, than when the face of the vehicle driver is oriented in the reference direction. Conversely, when the face of the vehicle driver is oriented in a direction rightward of the reference direction, the horizontal corrective coefficients KH1, KH2, KH3 are set to such values as to increase the intensities of infrared radiations emitted from the right lighting units 2c, 2f and the central lighting units 2b, 2e and reduce the intensities of infrared radiations emitted from the left lighting units 2a, 2d. Specifically, the horizontal corrective coefficients KH2, KH3 are set to values greater than "1" and the horizontal corrective coefficient KH1 is set to a value smaller than "1" in order to make the intensities of infrared radiations emitted from the right lighting units 2c, 2f and the central lighting units 2b, 2e greater and to make the intensities of infrared radiations emitted from the left lighting units 2a, 2d smaller, than when the face of the vehicle driver is oriented in the reference direction.

Figure 5F:
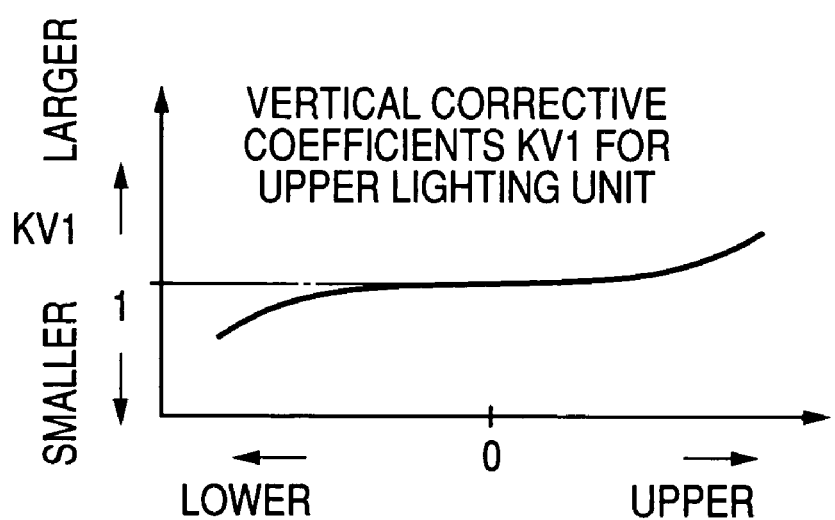
Figure 5G:
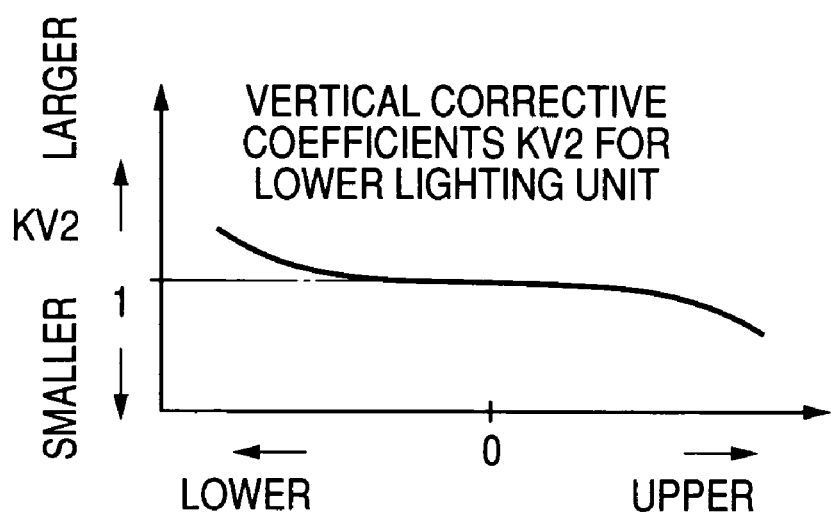

The corrective coefficients KV1, KV2 are vertical corrective coefficients that are set based on the vertical orientation of the face of the vehicle driver, or specifically a vertical shift of the face of the vehicle driver from a standard orientation (0) of the face wherein the vehicle driver sees straight forwardly, using maps shown in FIGS. 5F and 5G. The vertical corrective coefficient KV1 serves to correct the basic controlled variables Cao through Cco for the upper lighting units 2a through 2c that are mounted on the inner roof surface in the vehicle cabin, and the vertical corrective coefficient KV2 serves to correct the basic controlled variables Cdo through Cfo for the lower lighting units 2d through 2f that are mounted on the instrument panel in the vehicle cabin.

As shown in FIGS. 5F and 5G, the maps for determining the vertical corrective coefficients KV1, KV2 are established as follows; When the face of the vehicle driver is oriented in a direction upward of the reference direction, the vertical corrective coefficients KV1, KV2 are set to such values as to increase the intensities of infrared radiations emitted from the upper lighting units 2a through 2c and reduce the intensities of infrared radiations emitted from the lower lighting units 2d through 2f. Specifically, the vertical corrective coefficient KV1 is set a value greater than "1" and the vertical corrective coefficient KV2 is set a value smaller than "1" in order to make the intensities of infrared radiations emitted from the upper lighting units 2a through 2c greater and to make the intensities of infrared radiations emitted from the lower lighting units 2d through 2f smaller, than when the face of the vehicle driver is oriented in the reference direction. Conversely, when the face of the vehicle driver is oriented in a direction downward of the reference direction, the vertical corrective coefficients KV1, KV2 are set to such values as to increase the intensities of infrared radiations emitted from the lower lighting units 2d through 2f and reduce the intensities of infrared radiations emitted from the upper lighting units 2a through 2c. Specifically, the vertical corrective coefficient KV1 is set a value smaller than "1" and the vertical corrective coefficient KV2 is set a value greater than "1" in order to make the intensities of infrared radiations emitted from the lower lighting units 2d through 2f greater and to make the intensities of infrared radiations emitted from the upper lighting units 2a through 2c smaller, than when the face of the vehicle driver is oriented in the reference direction.

After the corrective coefficients KL1, KL2, KH1, KH2, KH3, KV1, KV2 with respect to the basic controlled variables Cao through Cfo have been calculated, the CPU 20 calculates, in step 210, specific controlled variables Ca, Cb, Cc, Cd, Ce, Cf for the lighting units 2a through 2f based on the calculated corrective coefficients KL1, KL2, KH1, KH2, KH3, KV1, KV2 and the basic controlled variables Cao through Cfo, according to the following equations:

$$Ca = Cao \times KL1 \times KH1 \times KLV1$$

$$Cb = Cbo \times KL1 \times KH2 \times KLV1$$

$$Cc = Cco \times KL1 \times KH3 \times KLV1$$

$$Cd = Cdo \times KL2 \times KH1 \times KLV2$$

$$Ce = Ceo \times KL2 \times KH2 \times KLV2$$

$$Cf = Cfo \times KL2 \times KH3 \times KLV2$$

Thereafter, the CPU 20 operates the driver circuits 12a through 12f for the lighting units 2a through 2f based on the respective specific controlled variables Ca through Cf to supply electric currents corresponding to the respective specific controlled variables Ca through Cf to the lighting units 2a through 2f in step 220, As a result, the intensities of infrared radiations emitted from the lighting units 2a through 2f are controlled so as to be commensurate with the respective specific controlled variables Ca through Cf.

Then, the illuminance sensor 4 detects the illuminance around the driver seat in the vehicle cabin in step 230. In step 240, the CPU 20 determines whether or not the detected illuminance has changed from the illuminance detected in step 110 or the illuminance detected in step 230 in a preceding cycle.

If the detected illuminance has changed in step 240, then the CPU 20 corrects the basic controlled variables Cao through Cfo for the lighting units 2a through 2f based on the illuminance change in step 250. Thereafter, control goes back to step 210. Consequently, the controlled variables for the lighting units 2a through 2f are updated depending on the detected illuminance in the vehicle cabin, for enabling the lighting units 2a through 2f to irradiate the vehicle driver with infrared radiations having intensities suitable for the imaging device 6 to capture an adequate image of the vehicle driver.

If the detected illuminance has not changed in step 240, then the CPU 20 acquires the processed image data from the image processor 16 in step 260. In step 270, the CPU 20 recognizes the position and orientation of the face of the vehicle driver based on the acquired processed image data.

In step 280, the CPU 20 determines whether or not the recognized position and orientation have changed from the position and orientation that have been recognized in step 190 or the position and orientation that have been recognized in step 270 in a preceding cycle. If the recognized position and orientation have not changed, then control goes back to step 240 to repeat the processing in steps 240 through 280.

If the recognized position and orientation have changed in step 280, then the CPU 20 updates the corrective coefficients corresponding to the recognized position and orientation based on the change in the recognized position and orientation in step 290. Thereafter, control goes back to step 210. As a result, the controlled variables for the lighting units 2a through 2f are updated depending on the movement of the vehicle driver in the vehicle cabin, for enabling the lighting units 2a through 2f to irradiate the vehicle driver with infrared radiations having intensities suitable for the imaging device 6 to capture an adequate image of the vehicle driver.

With the vehicle cabin lighting apparatus according to the first embodiment, as described above, the intensities of the infrared radiations emitted from the six lighting 2a through 2f disposed near and around the driver seat and the vertical or horizontal balance of the intensities of the emitted infrared radiations are individually controlled based on the illuminance in the vehicle cabin which is detected by the illuminance sensor 4, the brightness of the image captured by the imaging device 6, the position of the vehicle driver in the longitudinal direction of the vehicle, which position is obtained by processing the captured image, and the position and orientation of the face of the vehicle driver, which position and orientation are also obtained by processing the captured image.

Therefore, the vehicle cabin lighting apparatus according to the first embodiment allows the imaging device 6 to capture an optimum image of the vehicle driver at all times even if the illuminance in the vehicle cabin changes as the vehicle travels on or due to weather changes or the like, or even if the seated position of the vehicle driver on the driver seat or the orientation of the face of the vehicle driver is shifted from a reference position or orientation. The vehicle cabin lighting apparatus makes it possible for the imaging device 6 to have a wider range in which to capture an image of the vehicle driver.

Since the imaging device 6 has a wider image capturing range, the behavior detecting device 11 is capable of accurately detecting a behavior, such as a doze, of the vehicle driver from the image captured by the imaging device, or specifically the processed image data generated by the image processor 16. The vehicle cabin lighting apparatus thus prevents the behavior detecting device 11 from erroneously detecting a behavior of the vehicle driver owing to a lighting intensity shortage on the vehicle driver.

Figure 6:
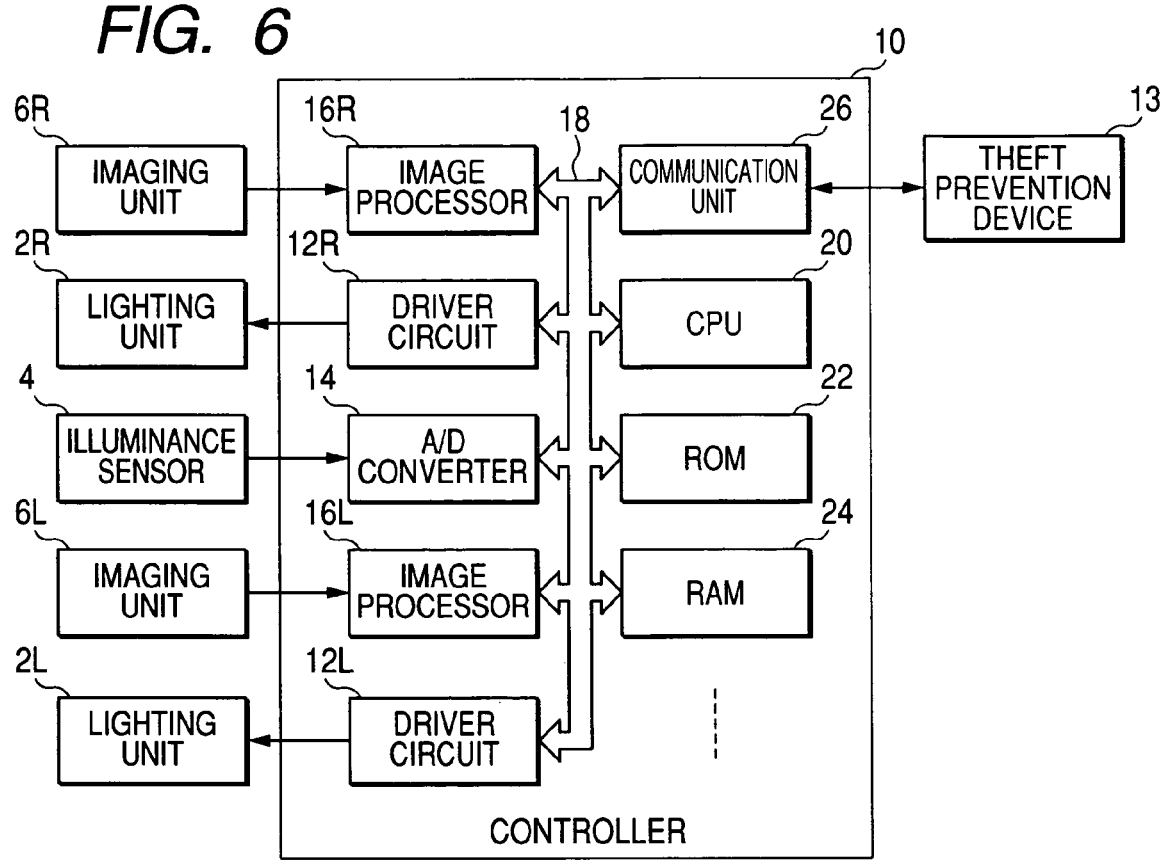
FIG. 6 is a block diagram of a vehicle cabin lighting apparatus according to a second embodiment of the present invention.

FIG. 6 shows in block form a vehicle cabin lighting apparatus according to a second embodiment of the present invention.

Figure 7:
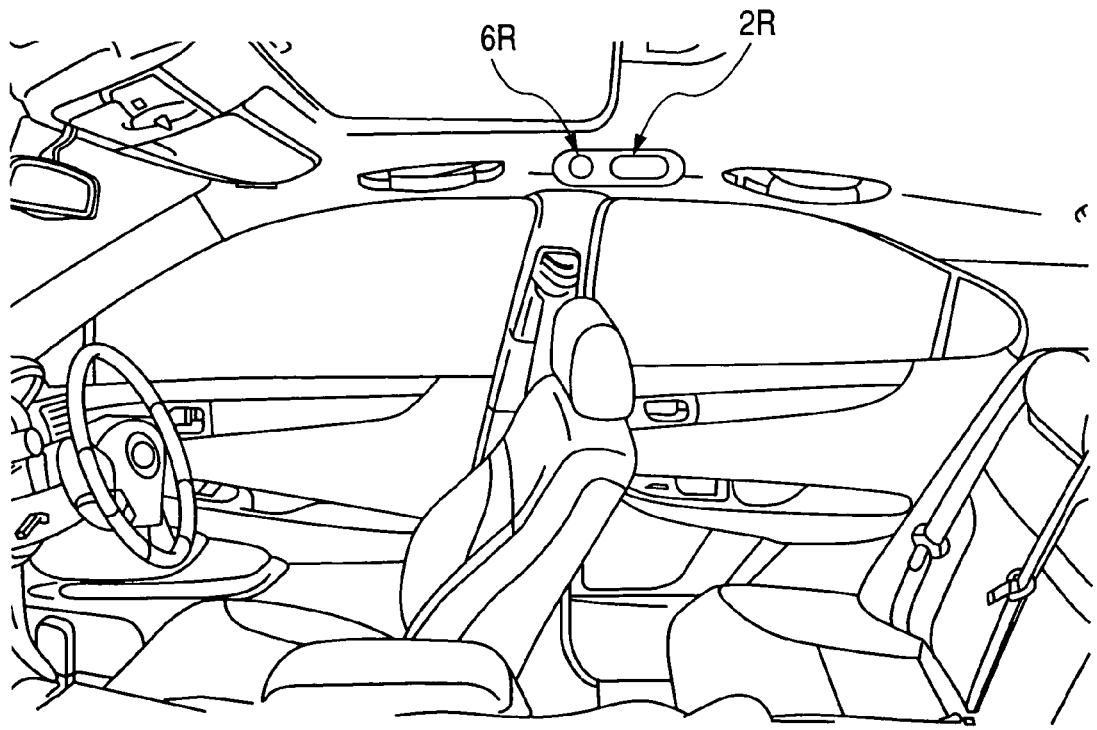
FIG. 7 is a fragmentary perspective view showing the layout of a lighting unit and an imaging device in a vehicle cabin incorporating the vehicle cabin lighting apparatus according to the second embodiment.

As shown in FIG. 6, the vehicle cabin lighting apparatus according to the second embodiment has two lighting units 2L, 2R disposed on a lower roof surface respectively above left and right doors of a vehicle, for emitting light, specifically infrared radiations, toward the opposite doors across the vehicle cabin, two imaging devices 6L, 6R disposed near the lighting units 2L, 2R, respectively, for capturing respective images of the doors that are irradiated by the lighting units 2L, 2R, and an illuminance sensor 4 for detecting the illuminance in the vehicle cabin. The alphabetical letters "L", "R" added to the reference numerals "2", "6" representing the lighting units and the imaging devices indicate association with left and right doors, respectively, of the vehicle. As shown in FIG. 7, the lighting unit 2R and the imaging device 6R are positioned on the lower roof surface above the right doors. The lighting unit 2L and the imaging device 6L are positioned on the lower roof surface above the left doors.

The vehicle cabin lighting apparatus according to the second embodiment also has a controller including a CPU 20, a ROM 22, a RAM 24, and a bus 18 interconnecting the CPU 20, the ROM 22, and the RAM 24. The controller 10 is implemented by a microcomputer. The lighting units 2L, 2R, the imaging devices 6L, 6R, and the illuminance sensor 4 are electrically connected to the controller 10.

The controller 10 also includes two driver circuits 12L, 12R for regulating electric currents supplied to the respective lighting units 2L, 2R to control the intensities of infrared radiations emitted from the lighting units 2L, 2R. The driver circuits 12L, 12R are connected to the bus 18. The controller 10 further includes an A/D converter 14 for converting a signal representing the detected illuminance into digital data, two image processors 16L, 16R for processing the data of images captured by the imaging devices 6L, 6R to extract features of an unauthorized intruder who has entered or is entering the vehicle cabin, and a communication unit 26 for performing data communication with a theft prevention device 13 mounted on the vehicle. The A/D converter 14, the image processors 16L, 16R, and the communication unit 16 are connected to the bus 18.

The theft prevention device 13 detects when the doors are illegally unlocked and an unauthorized intruder has entered or is entering the vehicle cabin. The controller 10 is activated when it is supplied from the theft prevention device 13 with an imaging command for capturing an image of the unauthorized intruder. When the controller 10 is activated, the CPU 20 executes a control program stored in the ROM 22 to enable the imaging device 6L or 6R to capture an image of the unauthorized intruder, and stores the captured image in the RAM 24 or a hard disk (not shown).

Figure 8:
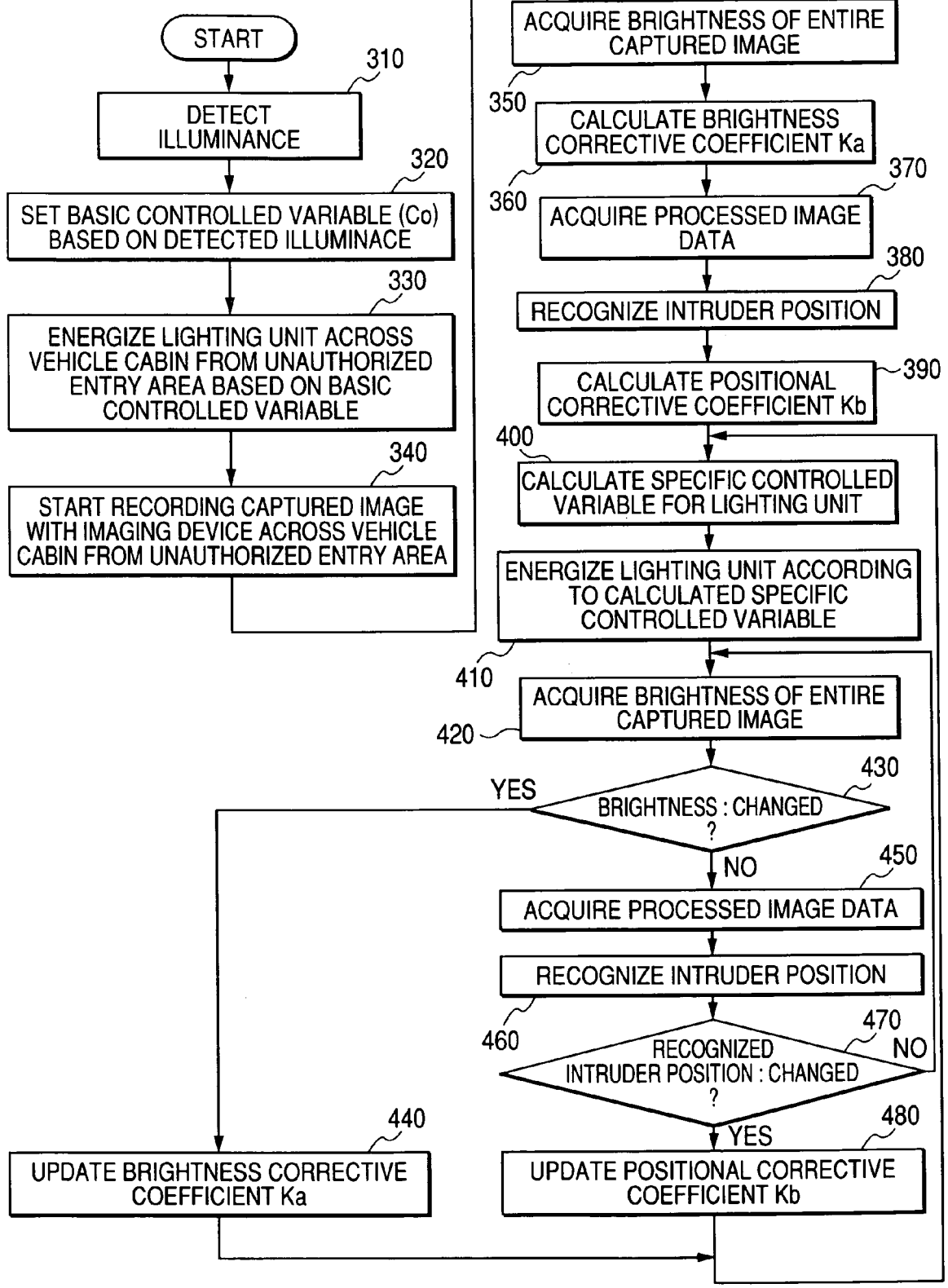
FIG. 8 is a flowchart of a control process carried out by a controller of the vehicle cabin lighting apparatus according to the second embodiment.

A control process that is performed by the CPU 20 will be described below with reference to FIG. 8.

When the controller 10 is activated by the imaging command from the theft prevention device 13 and the CPU 20 starts to perform the control process, the illuminance sensor 4 detects the illuminance around the driver seat in the vehicle cabin in step 310. The imaging command from the theft prevention device 13 is accompanied by an entry area signal indicative of an unauthorized entry area in the vehicle cabin where the unauthorized intruder has entered or is entering the vehicle cabin. Then, the CPU 20 sets a basic controlled variable Co for controlling an electric current to be supplied to the lighting unit 2L or 2R and hence the intensity of a infrared radiation emitted from the lighting unit 2L or 2R, based on the detected illuminance in step 320. In step 330, the CPU 20 energizes the lighting unit 2L or 2R, which is positioned across the vehicle cabin from the unauthorized entry area indicated by the entry area signal, based on the basic controlled variable Co.

In step 340, the CPU 20 energizes the imaging device 6L or 6R positioned near the energized lighting unit 2L or 2R, i.e., positioned across the vehicle cabin from the unauthorized entry area, and starts recording the data of an image captured by the energized imaging device 6L or 6R on the hard disk or the like.

In step 350, the CPU 20 acquires the brightness of the entire image that is captured by the imaging device 6, from the image processor 16. In step 360, the CPU 20 calculates a brightness corrective coefficient Ka with respect to the basic controlled variable Co based on a shift of the acquired brightness from a reference brightness level.

Then, in step 370, the CPU 20 acquires the processed image data from the image processor 16. In step 380, the CPU 20 recognizes the position of the unauthorized intruder, specifically the distance from the energized lighting unit 2L or 2R to the unauthorized intruder, based on the acquired processed image data. The CPU 20 calculates positional corrective coefficient Kb with respect to the basic controlled variable Co based on the recognized position in step 390. The CPU 20 calculates the positional corrective coefficient Kb using the map shown in FIG. 5A or 5B, for example.

Thereafter, in step 400, the CPU 20 calculates a specific controlled variable C for the lighting unit 2L or 2R based on the basic controlled variable Co, the brightness corrective coefficient Ka, and the positional corrective coefficient Kb, according to the equation: $C = Co \times Ka \times Kb$. In step 410, the CPU 20 operates the driver circuit 12L or 12R based on the specific controlled variable C to supply an electric current corresponding to the specific controlled variable C to the lighting unit 2L or 2R. As a result, the intensity of an infrared radiation emitted from the lighting unit 2L or 2R is controlled so as to be commensurate with the specific controlled variable C.

Thereafter, in step 420, the CPU 20 acquires the brightness of the entire image that is captured by the imaging device 6L or 4R, from the image processor 16. In step 430, the CPU 20 determines whether or not the acquired brightness has changed from the brightness acquired in step 350 or the brightness acquired in step 420 in a preceding cycle.

If the acquired brightness has changed in step 430, then the CPU 20 updates the brightness corrective coefficient Ka based on the brightness change in step 440. Then, control goes back to step 400. As a result, the basic controlled variable Co for the lighting unit 2L or 2R is updated depending on the brightness of the entire captured image, for enabling the lighting unit 2L or 2R to irradiate the vehicle cabin with an infrared radiation having an intensity suitable for the imaging device 6L or 6R to capture an adequate image of the unauthorized intruder.

If the acquired brightness has not changed in step 430, then the CPU 20 acquires the processed image data from the image processor 16 in step 450. In step 460, the CPU 20 recognizes the position of the unauthorized intruder based on the acquired processed image data.

In step 470, the CPU 20 determines whether or not the recognized position of the unauthorized intruder has changed from the position recognized in step 380 or the position recognized in step 460 in a preceding cycle. If the recognized position has not changed, then control goes back to step 400 to repeat the processing in steps 420 through 470.

If the recognized position has changed in step 470, then the CPU 20 corrects the corrective coefficient corresponding to the recognized position, i.e., the positional corrective coefficient Kb, based on the change in the recognized position in step 460. Thereafter, control goes back to step 400. As a result, the controlled variable for the lighting unit 2L or 2R is updated depending on the position of the unauthorized intruder in the vehicle cabin, for enabling the lighting unit 2L or 2R to irradiate the unauthorized intruder with an infrared radiation having an intensity suitable for the imaging device 6L or 6R to capture an adequate image of the unauthorized intruder.

With the vehicle cabin lighting apparatus according to the second embodiment, as described above, when the theft prevention device detects an unauthorized intruder who has entered or is entering the vehicle cabin, the lighting unit 2L or 2R and the imaging device 6L or 6R which are positioned above the door that is located across the vehicle cabin from the unauthorized entry area or door where the unauthorized intruder has entered or is entering the vehicle cabin are operated to capture an image of the unauthorized intruder and store the captured image. When the image of the unauthorized intruder is captured, the intensity of the infrared radiation emitted from the lighting unit 2L or 2R is controlled depending on the brightness of the entire captured image and the position of the unauthorized intruder.

Consequently, when unauthorized entry is made into the vehicle which is being parked in an attempt to steal the vehicle itself or an article or articles placed in the vehicle, the theft prevention device 13 issues an alarm to warn the unauthorized intruder, and the imaging device 6L or ER captures and records a clear image of the unauthorized intruder.

The vehicle cabin lighting apparatus mounted on the vehicle is effective to reduce the probability that an article or articles placed in the vehicle are stolen. Even if an article or articles placed in the vehicle are stolen, since the theft can be identified from the captured image, damage may be reduced.

In the above illustrated embodiments, the vehicle cabin lighting apparatus is used to capture an image of the face of the vehicle driver to detect a behavior such as a doze or the like, or to capture an image of an unauthorized intruder who has entered or is entering the vehicle cabin. However, the vehicle cabin lighting apparatus may be used to detect a behavior of a vehicle occupant seated on a front passenger seat in the vehicle cabin to control the manner in which an air bag is inflated.

Figure 9A:
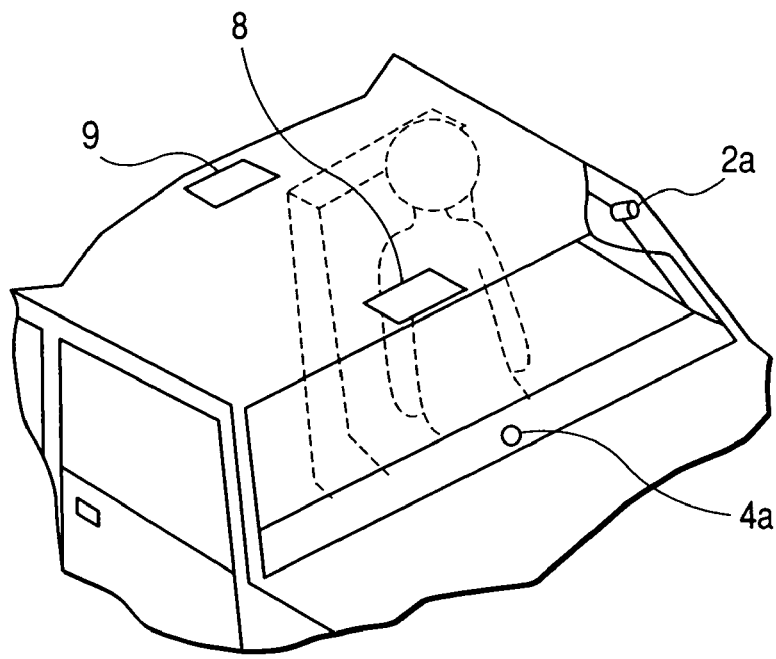
FIGS. 9A and 9B are fragmentary perspective and side elevational views, respectively, showing the layout of lighting units and an imaging device which are used to recognize the position of the head of a vehicle occupant seated on a front passenger seat in the vehicle cabin.
Figure 9B:
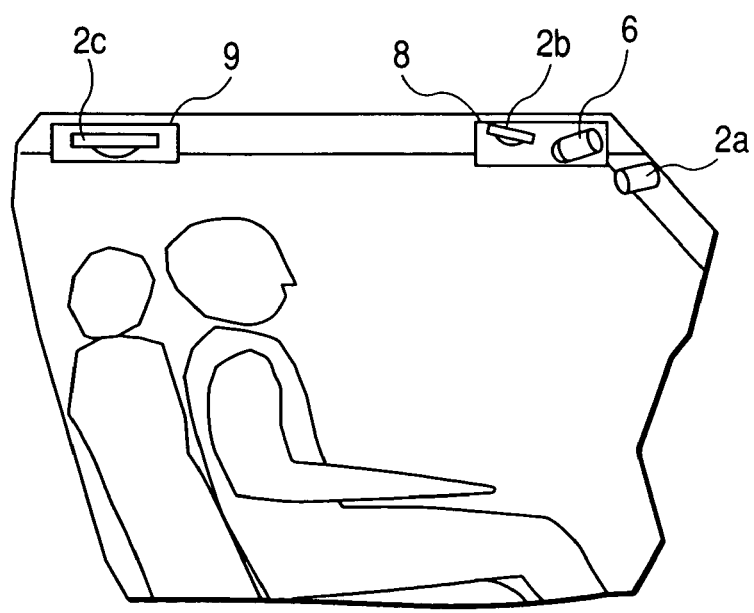

The vehicle cabin lighting apparatus as it is applied to such air bag control will be described in detail below. In the air bag control application, only the position of the head of the vehicle occupant seated on the front passenger seat may be detected. As shown in FIGS. 9A and 9B, a lighting unit 2a is mounted on the front pillar near the front passenger seat in the vicinity of the inner roof surface, a lighting unit 2b and an imaging device 6 are combined with a map lamp 8, and a lighting unit 2c is combined with a room lamp 9. The three lighting units 2a, 2b, 2c irradiates the vehicle occupant seated on the front passenger seat, and the imaging device 6 captures, from above, an image of the head of the vehicle occupant seated on the front passenger seat. The data of the image captured by the imaging device 6 is processed to recognize the position of the head of the vehicle occupant seated on the front passenger seat.

Depending on the brightness in the vehicle cabin, the intensities of infrared radiations emitted from the lighting units 2a, 2b, 2c are controlled, and the balance of the intensities of the emitted infrared radiations is adjusted depending on the position of the head of the vehicle occupant which is recognized from the image captured by the imaging device 6. Accordingly, the imaging device 6 can capture a clear image of the vehicle occupant, and a behavior of the vehicle occupant can be detected from the captured image to optimally control the manner in which the air bag is inflated.

In the above embodiments, the illuminance sensor 4 is used to detect the illuminance in the vehicle cabin. However, as shown in FIG. 9A, an illuminance sensor 4a disposed between the front windshield and the instrument panel for use in controlling the air-conditioning system on the vehicle may be used as a sensor for detecting the illuminance in the vehicle cabin.

According to the above embodiments in which each lighting unit emits an infrared radiation and the imaging device captures an image based on reflected infrared rays, the illuminance in the vehicle cabin needs to be detected as infrared illuminance. If the illuminance sensor 4a for controlling the air-conditioning system is used, then since sunlight contains radiations having different wavelengths at a substantially constant ratio, the brightness in the vehicle cabin may be determined from the illuminance detected by the illuminance sensor 4a, taking into account rates of attenuation by the front windshield and side window glass panels.

Figure 10A:
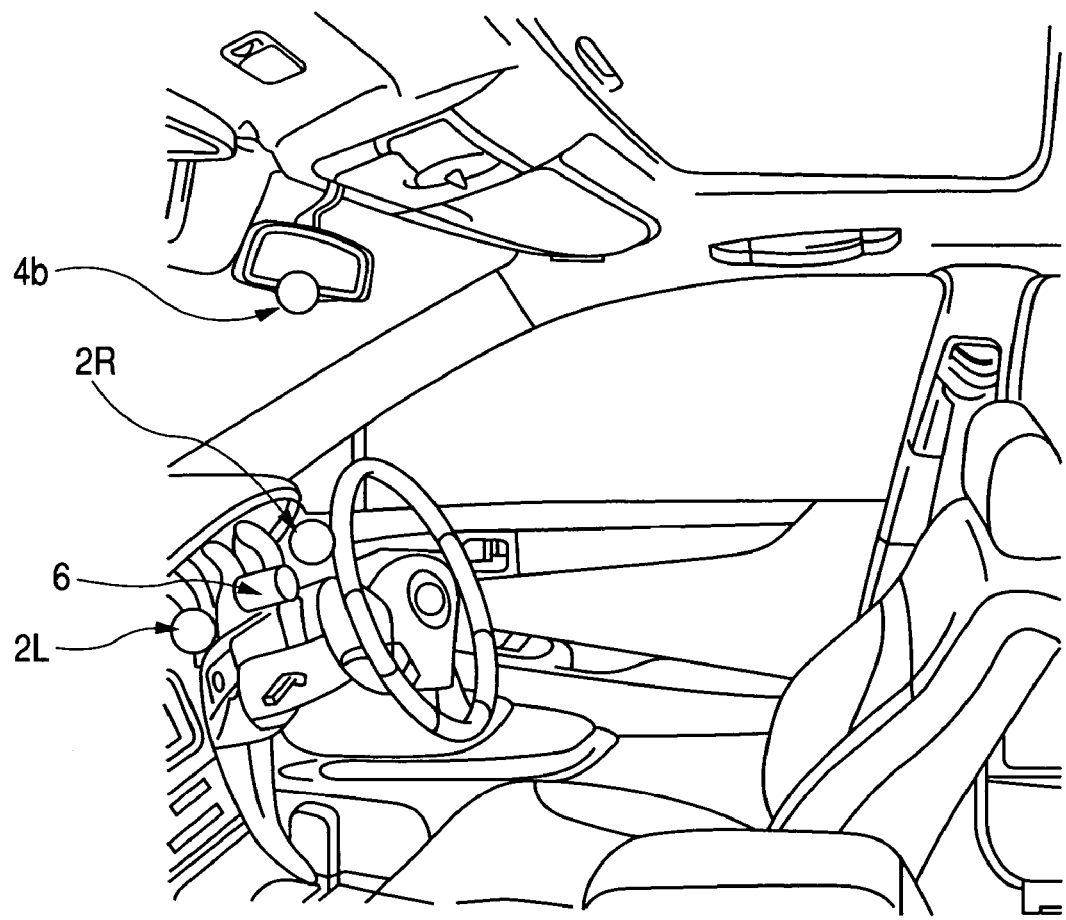
FIG. 10A is a fragmentary perspective view showing the layout of lighting units and an imaging device which are used to capture an image of a vehicle driver in the vehicle cabin, each of the lighting units being capable of vertically adjusting the direction of emitted light.

Some known automobiles have an automatic antiglare rearview room mirror for automatically adjusting its own light reflectance. As shown in FIG. 10A, the automatic antiglare rearview room mirror incorporates an illuminance sensor 4b for detecting the illuminance of light applied to the rearview room mirror. The illuminance sensor 4b incorporated in the automatic antiglare rearview room mirror may be used to detect the brightness in the vehicle cabin.

It is assumed that the illuminance sensor 4b incorporated in the automatic antiglare rearview room mirror or the illuminance sensor 4a disposed between the front windshield and the instrument panel is used to detect the brightness in the vehicle cabin. When the vehicle runs into or out of a tunnel, the brightness in the vehicle cabin abruptly changes at the entrance or exit of the tunnel. The brightness in the vehicle cabin actually changes after the detected signal from the illuminance sensor 4a or 4b changes. Consequently, there is a time delay occurring after the detected signal from the illuminance sensor 4a or 4b changes until the illuminance in the vehicle cabin actually changes. In addition, another time delay occurs after the lighting unit is controlled by the driver circuit to change the intensity of the emitted infrared radiation until the intensity of the infrared radiation emitted from the lighting unit actually changes. In view of these time delays, the change in the illuminance in the vehicle cabin is predicted, and the controlled variable for the lighting unit is corrected based on the predicted change. In this manner, the intensity of the infrared radiation emitted from the lighting unit is optimally controlled to prevent the image captured by the imaging device from becoming unduly dark or suffering halation.

Figure 10B:
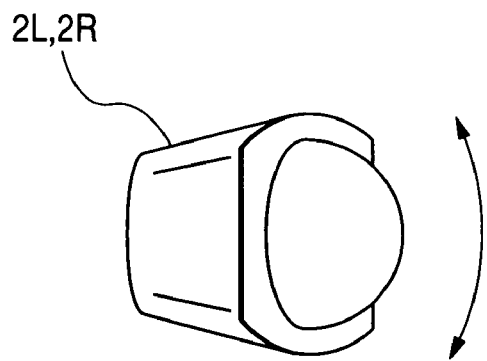
FIG. 10B is a perspective view of each of the lighting units shown in FIG. 10A, showing the vertically adjustable direction of emitted light.

In the first embodiment, each of the lighting units 2a through 2f emits an infrared radiation in a fixed direction, and the controller 10 adjusts the intensity of the infrared radiation emitted from each of the lighting units 2a through 2f to allow the imaging device 6 to capture an optimum image of the vehicle driver reliably. FIGS. 10A and 10B show lighting units 2L, 2R capable of vertically adjusting the direction of infrared radiations emitted therefrom. The lighting units 2L, 2R are disposed on respective left and right ends of the instrument panel of the vehicle. The controller 10 may control the lighting units 2L, 2R to vertically adjust the direction of infrared radiations emitted therefrom depending on the orientation of the face of the vehicle driver. Since the direction of infrared radiations emitted from the lighting units 2L, 2R can be vertically changed, the number of lighting units disposed in the vehicle may be reduced though they are still capable of adequately lighting the vehicle driver.

Figure 11A:
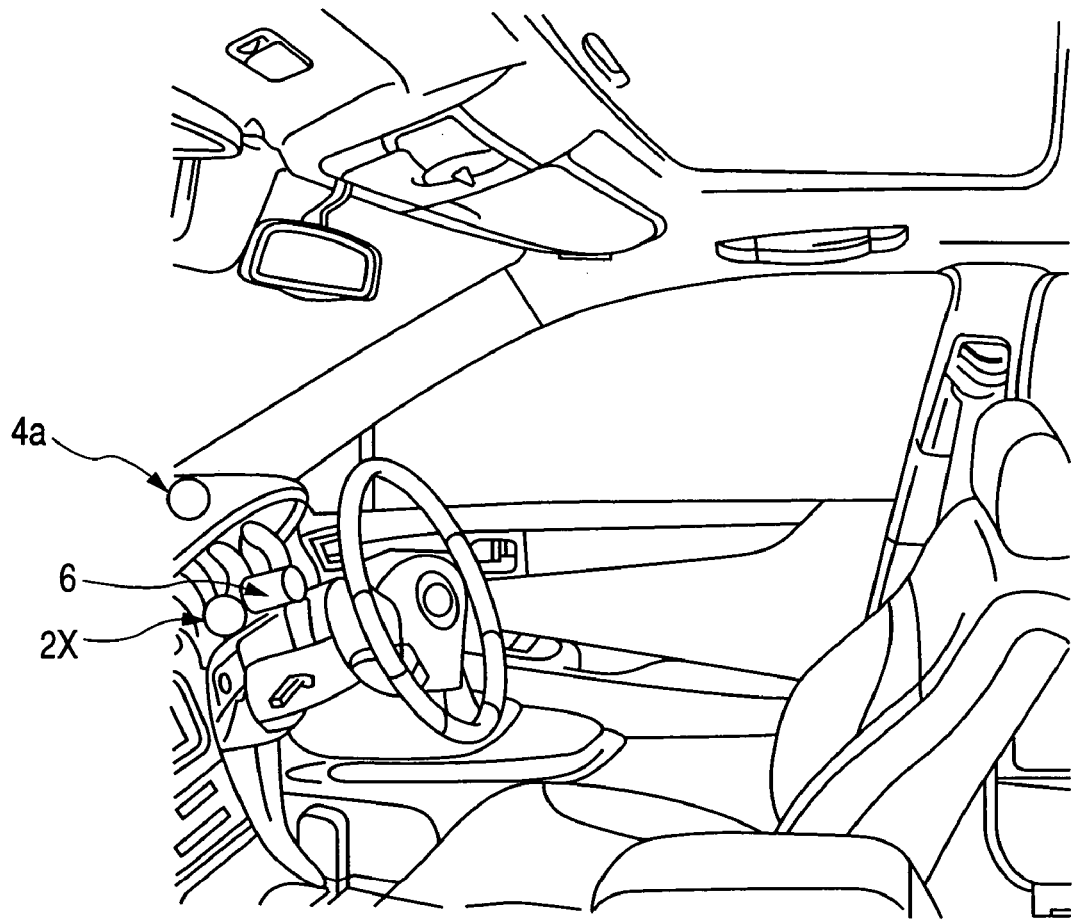
FIG. 11A is a fragmentary perspective view showing the layout of a lighting unit and an imaging device which are used to capture an image of a vehicle driver in the vehicle cabin, the lighting unit being capable of vertically and horizontally adjusting the direction of emitted light.
Figure 11B:
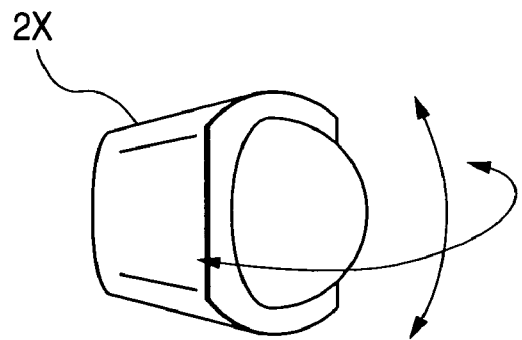
FIG. 11B is a perspective view of the lighting unit shown in FIG. 11A, showing the vertically and horizontally adjustable directions of emitted light.

FIGS. 11A and 11B show a lighting unit 2X capable of both vertically and horizontally adjusting the direction of an infrared radiation emitted therefrom. The lighting unit 2X can freely adjust the direction of an infrared radiation emitted therefrom. If the imaging device 6 is mounted on the instrument panel for capturing an image of the face of the vehicle driver, then the lighting unit 2X is disposed near the imaging device 6, and the controller 10 adjusts the direction of an infrared radiation emitted from the lighting unit 2X depending on the position of the vehicle driver and the orientation of the face of the vehicle driver. The lighting unit 2X which is thus adjustable can adequately light the vehicle driver for allowing the imaging device 6 to capture a clear image of the face of the vehicle driver.

Figure 12A:
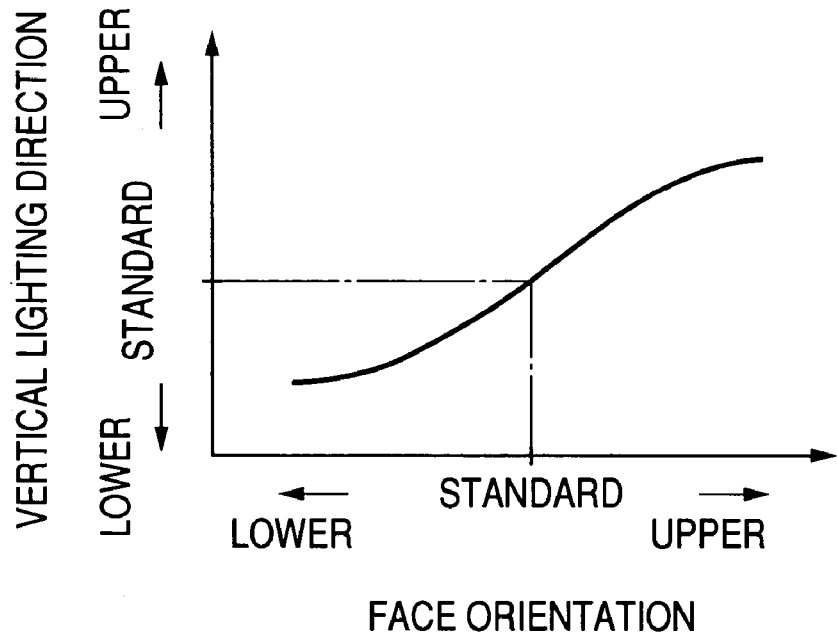
FIGS. 12A and 12B are diagrams showing maps that are used to control the direction of light emitted from the lighting units shown in FIGS. 10B and 11B.
Figure 12B:
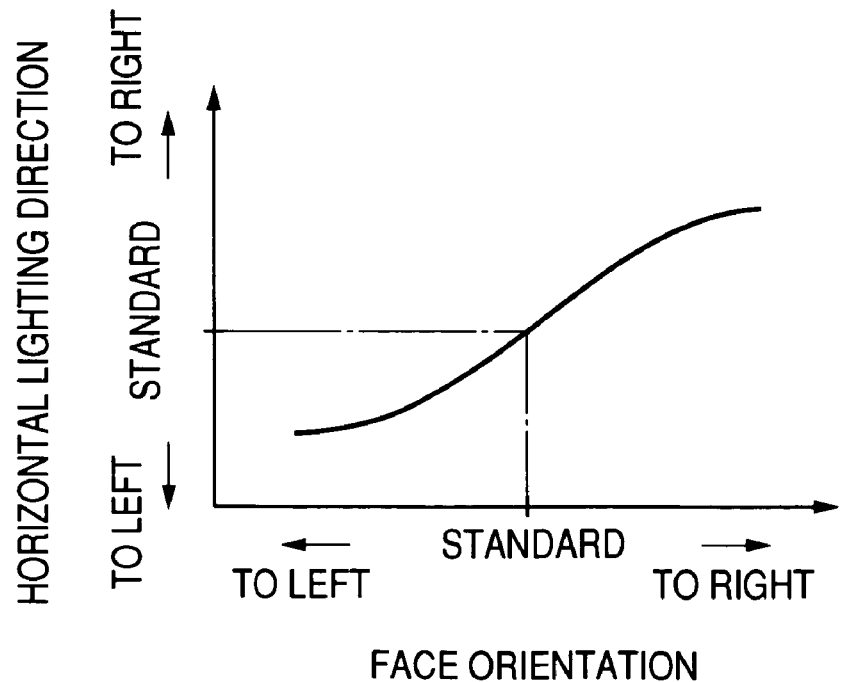

The lighting units 2L, 2R shown in FIGS. 10A and 10B are controlled to vertically adjust the direction of infrared radiations emitted therefrom according to a map shown in FIG. 12A. Specifically, when the face of the vehicle driver is oriented upwardly, the direction of infrared radiations emitted from the lighting units 2L, 2R is oriented upwardly, and when the face of the vehicle driver is oriented downwardly, the direction of infrared radiations emitted from the lighting units 2L, 2R is oriented downwardly, according to the map shown in FIG. 12A. The lighting unit 2X shown in FIGS. 11A and 11B are controlled to vertically and horizontally adjust the direction of an infrared radiation emitted therefrom according to maps shown in FIGS. 12A and 12B. Specifically, the direction of an infrared radiation emitted from the lighting unit 2X is vertically adjusted according to the map shown in FIG. 12A. When the face of the vehicle driver is oriented leftwardly, the direction of an infrared radiation emitted from the lighting unit 2X is oriented leftwardly, and when the face of the vehicle driver is oriented rightwardly, the direction of an infrared radiation emitted from the lighting unit 2X is oriented leftwardly, according to the map shown in FIG. 12B.

Figure 13A:
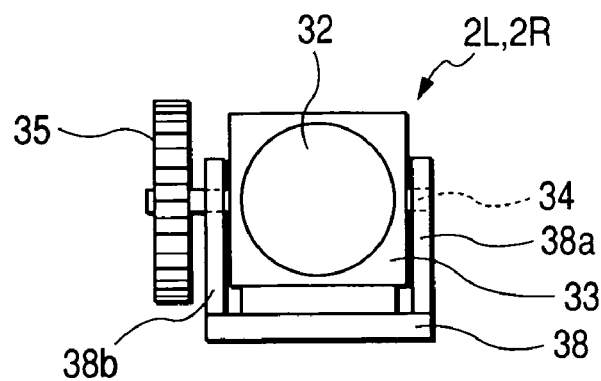
FIGS. 13A, 13B, and 13C are front elevational, plan, and side elevational views, respectively, of the lighting unit shown in FIG. 10B.
Figure 13B:
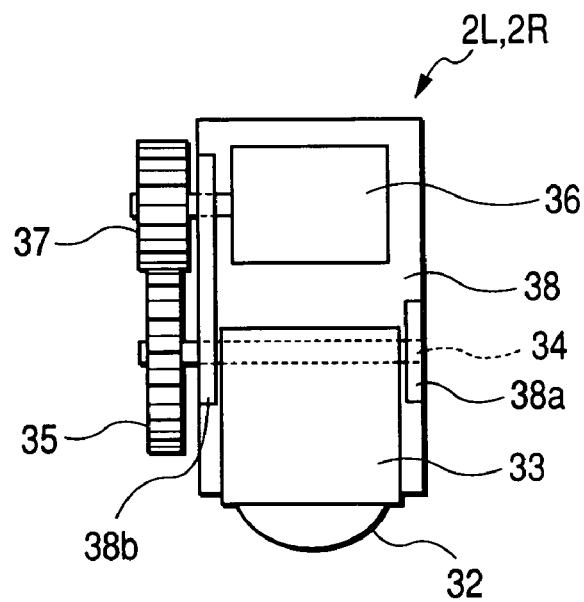
Figure 13C:
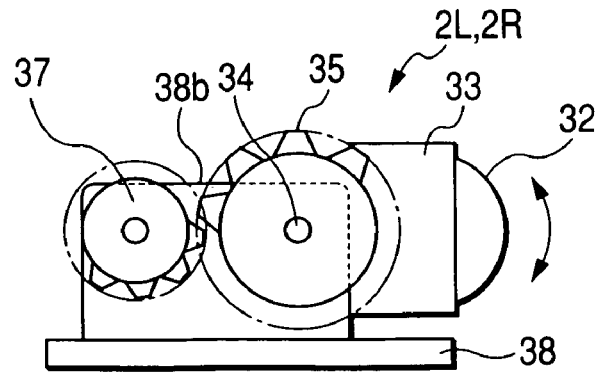

FIGS. 13A through 13C show structural details of each of the lighting units 2L, 2R illustrated in FIGS. 10A and 10B. As shown in FIGS. 13A through 13C, each of the lighting units 2L, 2R has a light-emitting element 32 mounted on a horizontal shaft 34 that is rotatably supported on a pair of vertical side walls 38a, 38b mounted on a base 38. The shaft 34 has an end fixed to a gear 35 that is held in mesh with a gear 37 fixed to the rotatable shaft of a motor 36 which is fixedly mounted on the base 38. When the motor 36 is energized, the gears 37, 35 are rotated to cause the shaft 34 to angularly move the light-emitting element 32 vertically about the axis of the shaft 34.

Figure 14A:
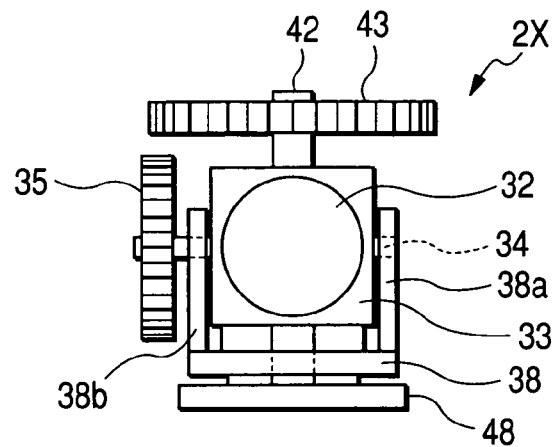
FIGS. 14A, 14B, and 14C are front elevational, plan, and side elevational views, respectively, of the lighting unit shown in FIG. 11B.
Figure 14B:
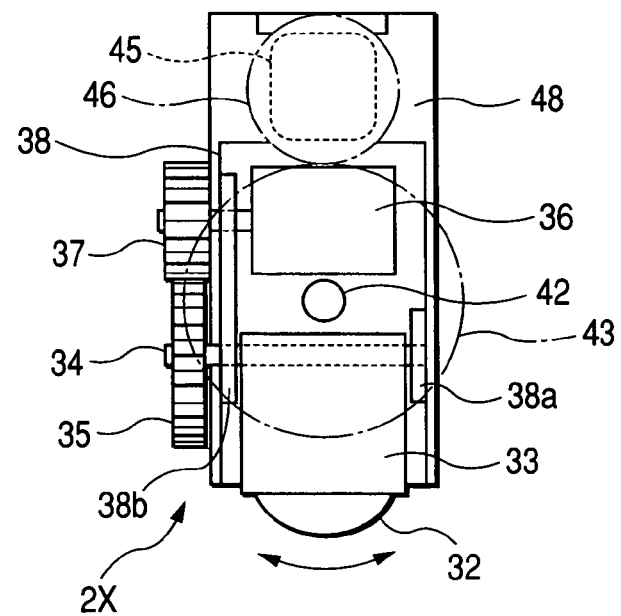
Figure 14C:
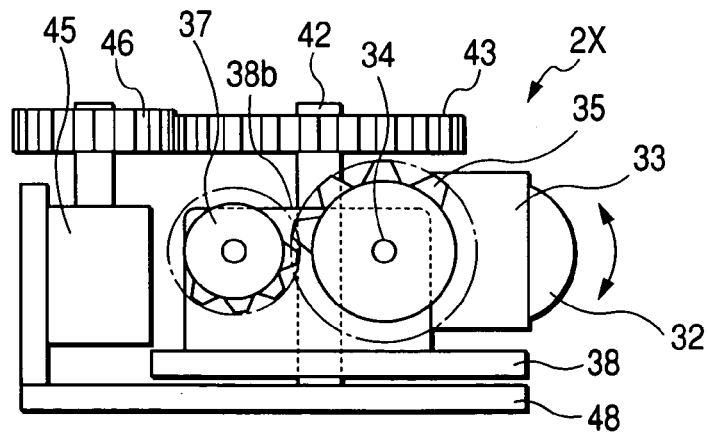

FIGS. 14A through 14C show structural details of the lighting unit 2X illustrated in FIGS. 11A and 111. As shown in FIGS. 14A through 14C, the lighting unit 2X has a light-emitting element 32, a horizontal shaft 34, vertical side walls 38a, 38b, a base 38, gears 35, 37, and a motor 36 which are identical to those shown in FIGS. 13A through 13C. The lighting unit 2X also has a vertical shaft 42 by which the base 38 is horizontally angularly movably mounted on a base 48. The shaft 42 has an end fixed to a gear 43 that is held in mesh with a gear 46 fixed to the rotatable shaft of a motor 45 which is fixedly mounted on the base 48. When the motor 45 is energized, the gears 46, 43 are rotated to cause the shaft 42 to angularly move the base 38 and hence light-emitting element 32 horizontally about the axis of the shaft 42.

In the above embodiments, each of the lighting units 2a through 2f, 2L, 2R, and 2X emit an infrared radiation. However, the lighting units may emit visible light, a combination of visible light and an infrared radiation, an ultraviolet radiation, a combination of visible light and an ultraviolet radiation, or a combination of visible light, an infrared radiation, and an ultraviolet radiation.

Although certain preferred embodiments of the present invention have been shown and described in detail, it should be understood that various changes and modifications may be made therein without departing from the scope of the appended claims.

What is claimed is:

1. A vehicle cabin lighting apparatus for lighting a vehicle cabin comprising:
   a plurality of lighting units disposed at different positions, respectively, in the vehicle cabin, emitting intensities of light to allow an imaging device installed in the vehicle cabin to capture at all times an optimum image of a face of a vehicle driver;
   the imaging device, disposed in the vehicle cabin, capturing an image of the vehicle driver, including the face of the vehicle driver, in the vehicle cabin;
   a light emission controller, including a plurality of driver circuits and an image processor for processing data of the captured image by the imaging device, performing the following steps:
      setting basic controlled variables for controlling the electric currents to be supplied to the plurality of lighting unit;
      energizing the plurality of driver circuits to supply first electric currents to the plurality of lightning unit based on the set basic controlled variables;
      acquiring a brightness of the image of the vehicle driver captured by the imaging device from the image processor;
      determining whether the acquired brightness of the image of the vehicle driver falls in a preset allowable range;
      correcting the set basic controlled variables if the acquired brightness of the image of the vehicle driver does not fall in the preset allowable range;
      recognizing a position and orientation of the face of the vehicle driver;
      calculating corrective coefficients including positional corrective coefficients, horizontal corrective coefficients and vertical corrective coefficients, based on the recognized position and orientation, which are based on a forward or rearward shift of the face of the vehicle driver, a horizontal shift of the face of the vehicle driver and a vertical shift of the face of the vehicle driver, respectively, from a standard orientation of the face of the vehicle;
      calculating specific controlled variables based on the set basic controlled variables and the corrective coefficients;

energizing the plurality of driver circuits to supply second electric currents to the plurality of lighting units based on the calculated specific controlled variables, so that the intensities of light emitted from said plurality of lighting units commensurate with the calculated specific controlled variables, thereby ensuring the optimum image of the face of the vehicle driver is captured at all times.

2. The vehicle cabin lighting apparatus according to claim 1, further comprising: a first illuminance sensor for detecting an illuminance in the vehicle cabin.

3. The vehicle cabin lighting apparatus according to claim 1, wherein said recognizing the position and orientation of the face of the vehicle driver includes determining the distances between feature points on the face of the vehicle driver and shapes of graphic patterns formed by lines interconnecting the feature points.

4. The vehicle cabin lighting apparatus according to claim 1, wherein said imaging device and said plurality of lighting units are disposed around a seat for imaging and lighting the vehicle driver and a vehicle occupant seated on the seat in the vehicle cabin.

5. The vehicle cabin lighting apparatus according to claim 1, further comprising:
a behavior detecting device that detects a behavior of the vehicle driver.

6. The vehicle cabin lighting apparatus according to claim 5, wherein said behavior detecting device detects a behavior of the vehicle driver from the image captured by the imaging device.

7. The vehicle cabin lighting apparatus according to claim 1, wherein the intensities of light emitted from said plurality of lighting units are infrared radiations.

8. A method for lighting a vehicle cabin comprising:
emitting intensities of light to allow an imaging device installed in the vehicle cabin to capture at all times an optimum image of a face of a vehicle driver by a plurality of lighting units disposed at different positions, respectively, in the vehicle cabin;
capturing an image of the vehicle driver, including the face of the vehicle driver, in the vehicle cabin by the imaging device deposed in the vehicle cabin;
controlling a light emission by a controller, including a plurality of driver circuits and an image processor for processing data of the captured image by the imaging device, comprising:
setting basic controlled variables for controlling the electric currents to be supplied to the plurality of lighting unit;
energizing the plurality of driver circuits to supply first electric currents to the plurality of lightning unit based on the set basic controlled variables;
acquiring a brightness of the image of the vehicle driver captured by the imaging device from the image processor;
determining whether the acquired brightness of the image of the vehicle driver falls in a preset allowable range;
correcting the set basic controlled variables if the acquired brightness of the image of the vehicle driver does not fall in the preset allowable range;
recognizing a position and orientation of the face of the vehicle driver;
calculating corrective coefficients including positional corrective coefficients, horizontal corrective coefficients and vertical corrective coefficients, based on the recognized position and orientation, which are based on a forward or rearward shift of the face of the vehicle driver, a horizontal shift of the face of the vehicle driver and a vertical shift of the face of the vehicle driver, respectively, from a standard orientation of the face of the vehicle;
calculating specific controlled variables based on the set basic controlled variables and the corrective coefficients;
energizing the plurality of driver circuits to supply second electric currents to the plurality of lighting units based on the calculated specific controlled variables, so that the intensities of light emitted from said plurality of lighting units commensurate with the calculated specific controlled variables, thereby ensuring the optimum image of the face of the vehicle driver is captured at all times.

* * * * *